United States Patent [19]

Holmes

[11] Patent Number: 4,899,282
[45] Date of Patent: Feb. 6, 1990

[54] METHOD AND APPARATUS FOR CONTROLLING AN INTERNAL COMBUSTION ENGINE

[75] Inventor: Michael Holmes, Birmingham, England

[73] Assignee: Lucas Industries public limited company, Birmingham, England

[21] Appl. No.: 16,790

[22] Filed: Feb. 20, 1987

Related U.S. Application Data

[63] Continuation-in-part of Ser. No. 888,067, Jul. 22, 1986, Pat. No. 4,843,556.

[30] Foreign Application Priority Data

Jul. 23, 1985 [GB] United Kingdom ................ 8518593
Feb. 20, 1986 [GB] United Kingdom ................ 8604259
Feb. 20, 1986 [GB] United Kingdom ................ 8604260

[51] Int. Cl.$^4$ ............................................. F02D 37/02
[52] U.S. Cl. .............................. 364/431.08; 123/425; 364/431.03
[58] Field of Search ............ 364/431.03, 431.05, 364/431.04, 431.08, 431.11, 431.12; 123/416, 435, 425, 436

[56] References Cited

U.S. PATENT DOCUMENTS

| | | | |
|---|---|---|---|
| 3,142,967 | 8/1964 | Schweitzer | 60/721 |
| 3,327,553 | 6/1967 | Peras | 74/858 |
| 3,789,816 | 2/1974 | Taplin et al. | 123/436 |
| 4,026,251 | 5/1977 | Schweitzer et al. | 123/436 |
| 4,181,944 | 1/1980 | Yamauchi et al. | 364/431 |
| 4,257,377 | 3/1981 | Kinugawa et al. | 123/492 |
| 4,259,723 | 3/1981 | Fujisawa et al. | 123/416 X |
| 4,268,910 | 5/1981 | Omori et al. | 123/425 X |
| 4,276,860 | 7/1981 | Capurka | 123/415 |
| 4,306,284 | 12/1981 | Malcolm | 364/148 |
| 4,318,979 | 2/1979 | Taplin | 123/119 EC |
| 4,319,327 | 3/1982 | Higashiyama et al. | 364/431.05 |
| 4,328,779 | 5/1982 | Hattori et al. | 123/416 |
| 4,344,140 | 8/1982 | Leung | 364/431.08 |
| 4,351,281 | 9/1982 | Geiger et al. | 123/425 |
| 4,357,662 | 11/1981 | Schira et al. | 364/431.08 |

(List continued on next page.)

FOREIGN PATENT DOCUMENTS

| | | |
|---|---|---|
| 0044656 | 1/1982 | European Pat. Off. . |
| 0120730 | 2/1984 | European Pat. Off. . |
| 0155680 | 9/1985 | European Pat. Off. . |
| 2930540 | 2/1981 | Fed. Rep. of Germany . |
| 1257779 | 12/1971 | United Kingdom . |
| 1491622 | 1/1975 | United Kingdom . |
| 1543379 | 2/1976 | United Kingdom . |
| 2024462 | 3/1979 | United Kingdom . |
| 2005443 | 4/1979 | United Kingdom . |
| 2034930 | 10/1979 | United Kingdom . |
| 2042637 | 9/1980 | United Kingdom . |
| 2060062 | 9/1980 | United Kingdom . |
| 2049238 | 12/1980 | United Kingdom . |

(List continued on next page.)

*Primary Examiner*—Eugene R. LaRoche
*Assistant Examiner*—Seung Ham
*Attorney, Agent, or Firm*—Nixon & Vanderhye

[57] ABSTRACT

Disclosed is a method and apparatus for controlling an internal combustion engine having two inputs and one output affected by both inputs. One input is perturbed and the effect on the output is compared with a desired effect on the output. One or the other input is varied until the actual affect on the output is the same as the desired effect on output. In one embodiment, ignition timing is periodically varied and the effect upon engine speed is detected. The detected output variations (slope) are compared with predetermined output variations for the existing engine speed and load demand. Any error is used to correct fueling to the engine. Preferred embodiments include unique slop determination as well as a unique interpolation method of determining the engine input from a fixed schedule. In a further embodiment the error corrects the ignition timing directly and corrects fueling indirectly at a slower rate. Further embodiments control air/fuel ratio, engine roughness, exhaust gas recirculation, for individual cylinders or groups of cylinders or the engine as a whole, depending upon the change in engine output in response to the variation in engine input.

36 Claims, 17 Drawing Sheets

U.S. PATENT DOCUMENTS

| | | | |
|---|---|---|---|
| 4,375,668 | 3/1983 | Leung et al. | 364/431.08 |
| 4,379,239 | 4/1983 | Knuefelmann et al. | 123/609 X |
| 4,379,333 | 4/1983 | Ninomiya et al. | 364/431.05 |
| 4,381,748 | 5/1983 | Eckert et al. | 123/414 |
| 4,381,784 | 5/1983 | Aberson | 605/368 |
| 4,389,992 | 6/1983 | Shigematsu et al. | 123/419 |
| 4,403,584 | 9/1983 | Suzuki et al. | 123/417 |
| 4,433,381 | 2/1984 | Wilkinson | 364/431.05 |
| 4,448,162 | 5/1984 | Ninomiya et al. | 123/419 |
| 4,454,750 | 6/1984 | Yoshida et al. | 123/425 X |
| 4,467,765 | 8/1984 | Suzuki et al. | 123/419 |
| 4,471,736 | 9/1984 | Yoshida et al. | 123/425 |
| 4,478,185 | 10/1984 | Obayashi et al. | 123/419 |
| 4,479,476 | 10/1984 | Suzuki et al. | 123/478 |
| 4,498,438 | 2/1985 | Sato | 123/418 |
| 4,502,442 | 3/1985 | Takakuwa et al. | 123/419 |
| 4,503,824 | 3/1985 | Ninomiya et al. | 123/436 |
| 4,509,477 | 4/1985 | Takao et al. | 123/339 |
| 4,513,718 | 4/1985 | Ishii et al. | 123/435 |
| 4,527,524 | 7/1985 | Guipaud | 123/425 |
| 4,527,526 | 7/1985 | Akasu | 123/425 |
| 4,535,406 | 8/1985 | Johnson | 364/431.08 |
| 4,539,957 | 9/1985 | Haraguchi et al. | 123/425 |
| 4,547,852 | 10/1985 | Kamifugi et al. | 364/431.04 |
| 4,575,800 | 3/1986 | Kittelson | 364/431.05 |
| 4,586,473 | 5/1986 | Nguyen | 123/416 X |
| 4,596,217 | 6/1986 | Bonitz et al. | 123/425 |
| 4,653,449 | 3/1987 | Kamei et al. | 123/478 |
| 4,691,286 | 9/1987 | Obayashi et al. | 364/431.04 |
| 4,706,196 | 11/1987 | Muramatsu et al. | 364/431.05 |
| 4,715,344 | 12/1987 | Tomisawa | 123/489 |
| 4,799,469 | 1/1989 | Nagano et al. | 123/418 |

FOREIGN PATENT DOCUMENTS

| | | |
|---|---|---|
| 2099918 | 12/1982 | United Kingdom . |
| 2107785 | 5/1983 | United Kingdom . |
| 2140082 | 11/1984 | United Kingdom . |
| 2165063 | 1/1985 | United Kingdom . |
| 2169956 | 7/1986 | United Kingdom . |
| 2178195 | 2/1987 | United Kingdom . |

OTHER PUBLICATIONS

"Optimizing Control of Diesel Injection Timing", D. B. Kittelson and M. J. Pipho, University of Minnesota, U.S.A.

Lean Limit A/F Control System by Using Engine Speed Variation, Ina et al., SAE Paper 860413.

"Flame Arrival Sensing Fast Response Double Closed Loop Engineer Management", No. 84044 by Michael G. May, Antipollution Industrial Research S.A.

Garrigues et al., An Extrema Searching Controller for Mixture Strength Optimization on an Internal Combustion Engine, European Conference on Electronics, Mar. 28, 1980; pp. 591–595.

Article/"Notes Resulting from a USSR Action—M & C Letter 6/4/'87", 6 pages dated May 8, 1987 by John M. Ironside.

"Electronic Spark Timing Control for Motor Vehicles", SAE Technical Paper Series, Jun. 5–9, 1978, No. 780655, Schweitzer and Collings; 18 pages.

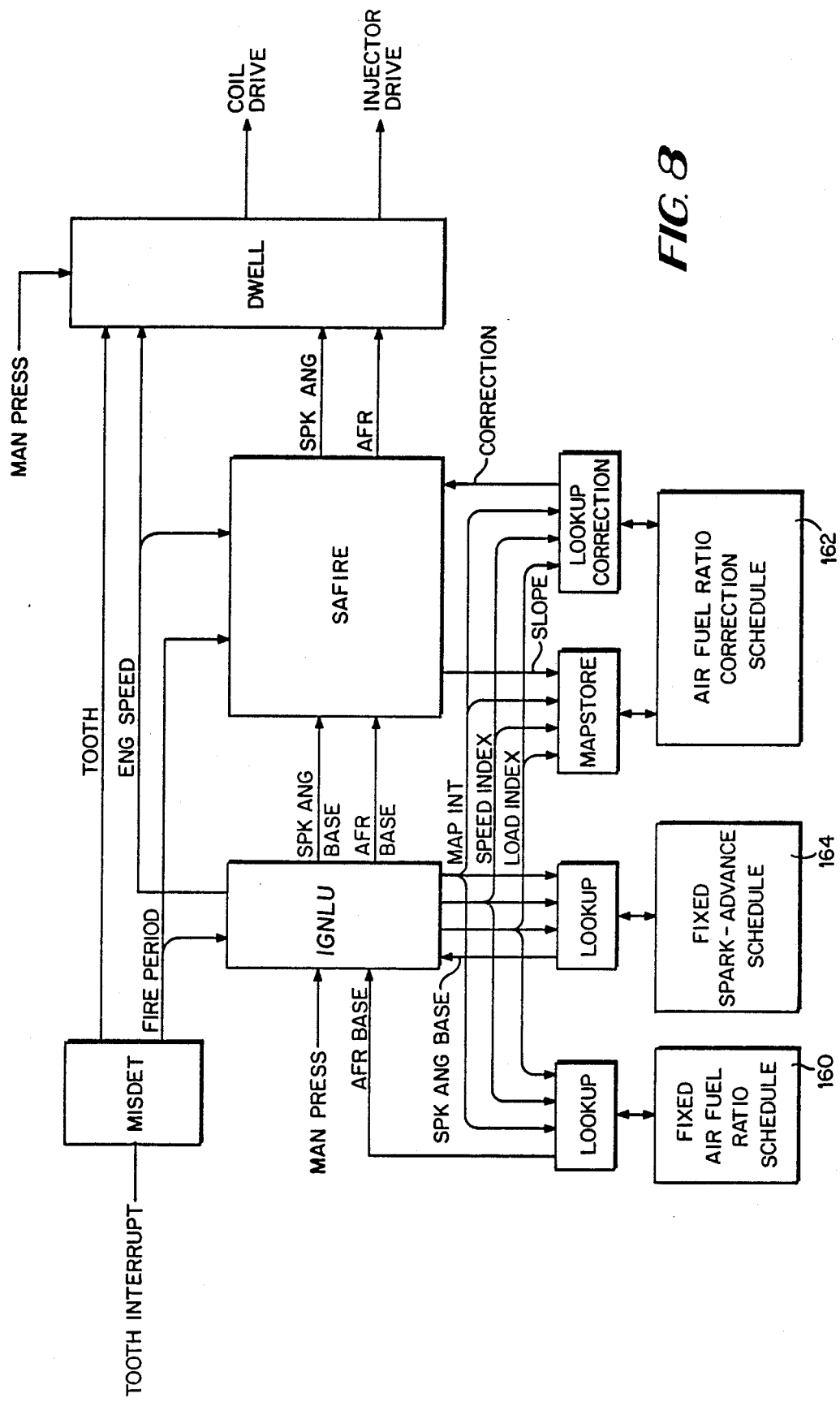

METHOD AND APPARATUS FOR CONTROLLING AN INTERNAL COMBUSTION ENGINE

This application is a continuation-in-part of U.S. Ser. No. 06/888,067 filed July 22, 1986 which issued as U.S. Pat. No. 4,843,556 on June 27, 1989.

BACKGROUND OF THE INVENTION

1. Field of the Invention

This invention relates generally to a method and apparatus for controlling an internal combustion engine and specifically to a method and apparatus for maintaining a desired combustion parameter in the engine even though there may be degradation of the engine or its controls.

2. Discussion of the Prior Art

In view of the increasing stringency of emission control regulations in various countries in recent years, many attempts have been made to improve fuel supply systems of engines to reduce noxious exhaust emissions while maintaining good engine drivability.

One well-known approach to controlling ignition timing and/or fuel injection in an internal combustion engine makes use of digital "maps" i.e. memories preprogrammed with data relating to ignition timing, fuel injection, exhaust gas recirculation (EGR), etc. for each of a multiplicity of combinations of values of two or more different engine parameters such as throttle valve angle, engine speed, manifold pressure, etc. While this approach has provided a great improvement in ignition and fueling efficiency (since such maps represent very complex surfaces unobtainable using mechanical cams or simple electronic function generators) they do not provide a completely adequate answer to emission and efficiency problems since there are many variables which cannot easily be taken into account. Such variables include fuel composition, partial fouling of fuel injectors, the effect of deposits on the engine cylinder head, ignition energy and spark gap variations, and cylinder to cylinder variability.

Attempts have been made to overcome these shortcomings by the introduction of closed loop controls in which an "output" of the engine is detected and a corresponding signal is fed back into a control system to adjust an "input" to the engine. Thus, for example, an oxygen sensor in the exhaust system can be used to adjust fueling and this will take care of variations in fuel composition and air/fuel ratio, but will not necessarily make correct adjustments in response to changes in other variables, such as exhaust gas recirculation (EGR) and compression ratio.

To cope with these problems, various sophisticated sensors have been designed to measure, for example, cylinder pressure or flame front ionization, but the use of these involves high cost, possible unreliability and some compromise in cylinder head geometry.

Closed loop mixture control systems have been proposed which detect the magnitude of the variation of engine output in successive combustion cycles. However, these methods only have good sensitivity with mixtures having air/fuel ratios close to the lean-running limit, or with mixtures having a large percentage of EGR.

It has also been proposed (see SAE paper No. 780655 "Electronic Spark Timing Control for Motor Vehicles" by Paul H. Schweitzer and Thomas W. Collins) to optimize ignition timing by means of a closed loop system in which a "dither" or periodic variation is superimposed on the ignition timing. The result of the dither is analyzed to determine the effect on engine output with respect to variations in ignition timing. The basic timing on which the dither is superimposed is adjusted to give a maximum of some engine output such as torque or speed. Thus, the basic ignition timing is adjusted so that a change in timing in either direction results in a reduction of engine torque or speed (since the timing would be moving away from the optimum).

It has been found, however, that optimizing spark timing in this way does not provide a complete answer, since it cannot correct errors which result from the fueling of the engine. With optimum fueling, optimizing of spark timing can certainly improve the emission performance, but if fueling is less than optimum, more is required.

In U.S. Pat. No. 4,379,333, there is described an adaptive control system for controlling the spark advance angle. In this system, small positive and negative perturbations are superimposed on the spark ignition angle and the resulting changes in engine speed are used to determine the differential or slope of engine output with respect to spark advance angle.

In the arrangement described in this patent, the perturbations are imposed in a three phase cycle, a positive perturbation being imposed in one phase, no perturbation being imposed in the next phase, and a negative perturbation being imposed in the last phase. Each phase comprises 40-60 engine fires and the engine speed is sensed over a number of engine fires at the end of each phase. The effect of the change in spark advance value at the beginning of each phase will cause an initial transient response in the engine speed but, by the end of the phase, a steady response is obtained. Thus, by delaying measurement of the engine speed until the end of the phase, the transient response is eliminated. However, this method suffers from the disadvantage that a large number of engine fires is required to make each slope measurement.

Values for the spark advance angle are stored in a read/write memory as a two dimensional array as a function of load demand and engine speed. Each slope value is examined. If it exceeds a predetermined value, depending upon its sign, a fixed quantity is added to, or subtracted from, the spark advance value stored at the nearest array point to the prevailing speed and load demand. A fractional amount of this fixed quantity is also added to, or subtracted from, the surrounding eight array points. The spark advance angle for each ignition spark is determined by interpolation from the values held in the four array points surrounding the prevailing load and speed.

In the arrangement described in this patent, the engine speed and load demand are measured a number of times during each perturbation cycle in order to determine the address for the correction which is to be made to the spark advance schedule. If the engine speed and load demand do not wander far from their initial values, these are regarded as a valid address. If excessive wander does occur, then a new address is chosen. At the end of each perturbation cycle, the record of the engine speed and load demand throughout the cycle is examined and, if one address occurs for more than, for example, 60% of the cycle, the conditions are considered steady enough to retain the correction at this address. Thus the arrangement of this patent suffers from the disadvantage that it requires a complicated and uncertain procedure for determining the addresses of the corrections.

The arrangement described in this patent suffers from two additional disadvantages. Firstly, as a fixed quantity is used to update the values held in the read/write memory, full advantage is not taken of the information available in each slope measurement. Secondly, the method of updating the read/write memory is not symmetrical with the interpolation method used to establish each spark advance angle and so the information available in each slope measurement is not stored to maximum advantage.

SUMMARY OF THE INVENTION

It is accordingly an object of this invention to provide a system and method of determining an input control parameter for an internal combustion engine. According to the invention, the system for determining an internal combustion engine input control parameter comprises: means for determining a first engine operating parameter; means for determining a second engine operating parameter; means for determining a basic value for a particular engine control parameter in accordance with a fixed map; a correction schedule means for storing correction values for said particular input control parameter as a two-dimensional array as a function of said two engine operating parameters; means for providing a calculated correction value for said two prevailing engine operating parameters, said providing means includes means for multiplying each of four correction values stored in said correction map means at four array points in said two-dimensional array which surround the prevailing engine operating parameters, by respective weighting factors to provide four product values and then summing said four product values to produce a calculated correction value; means for determining a command value for said particular input control parameter by summing said basic value and a calculated correction value; and means for updating said values stored in said correction schedule means, said updating means comprising means for producing a series of error values, multiplying each error value by a respective weighting factor for each of said four array points to form four product values, and using said four product values to update said correction values stored at said four array points, said weighting factors being determined by forming a main rectangle whose corners lie on said four array points surrounding the prevailing engine operating parameters, dividing said main rectangle into four sub-rectangles by an ordinate and abscissa which pass through said prevailing engine operating parameters, and calculating said weighting factor for each array point in dependence upon the area of the diagonally opposite sub-rectangle.

It is a further object of this invention to provide a system and method of determinations of slope of variations in engine output as a result of variations in an input control parameter. According to the invention, the system for the determination of slope of variations in engine output with respect to an input control parameter for an internal combustion engine, where said engine operates through a drive train and said engine and said drive train comprise a resonant system having at least one resonant frequency, said system comprises: means for determining a basic value for a first engine input control parameter; a position transducer for detecting the rotational position of said engine at least once during each engine fire period; a perturbation generator for perturbing said input control parameter about said basic value, said perturbation generator generating a periodic perturbation waveform and applying a positive perturbation to said input control parameter during the first part of each period of the perturbation waveform and a negative perturbation to said input control parameter during the second of each period of the perturbation waveform, each period of said waveform being equal to a whole number of engine fire periods and the frequency of said waveform being greater than three-quarters of the highest resonant frequency of the resonant system; means for creating at least one series of contiguous positive and negative measurement windows associated respectively with first and second parts of said perturbation waveform, each measurement window lagging its respective part of the perturbation waveform by a predetermined phase shift; and means for calculating the slope of engine output with respect to said input control parameter, said calculating means calculating said slope based upon the change in engine speed between adjacent measurement windows.

It is an object of the present invention to provide a method and an apparatus implementing the method of engine operation in which two input parameters of the engine can both be optimized for improved engine performance (particularly with reference to NOx emissions) without undue complication.

The invention rests on the discovery by the applicants that there is a predetermined fixed relationship (for any particular engine) between the optimum ignition timing for the maximum engine output and the mixture composition at a given engine speed and load demand. Load demand is defined as the demand for engine output power and can be indicated by fuel flow, air flow, mixture flow, throttle angle, inlet manifold pressure, etc. or combinations thereof. Such relationship can be established for a given engine and once established enables the actual mixture composition to be determined by measuring the ignition timing angle when the optimum ignition timing condition has been found.

In accordance with one embodiment of the invention, there is provided a method of and apparatus for operating an internal combustion engine having two control inputs both of which affect an engine output, comprising periodically perturbing one of the inputs about a base lie value established in accordance with engine operating conditions. The engine output is monitored and the other input is controlled in accordance with said engine output so as to obtain a desired relationship between the perturbations of said one input and the resulting changes in the engine output.

In one embodiment, one input is an input to an ignition timing control of the engine, the other input is a mixture composition control of one of the known types, such as an electronic fuel injection control, an electronically trimmed carburetor control or an exhaust gas recirculation control, etc. and the engine output is engine speed or torque. The ignition timing baseline value, about which the periodic perturbations take place, is derived from a map providing data for optimum spark angle in accordance with engine variables such as speed and load demand.

In accordance with another embodiment of the invention, there is provided a method of and apparatus for operating an internal combustion engine having two control inputs both of which affect an engine output comprising periodically perturbing one of the inputs about a baseline value and monitoring the engine output. The baseline value is adjusted in accordance with the engine output so as to obtain a desired relationship between the perturbations of said one input and the resulting changes in the engine output, and then establishing the value of said second input in accordance with the adjusted baseline value. Again, one input may be the input to an ignition timing control, the second input an input to an air/fuel ratio control and the output, engine speed.

Where the first input is ignition timing and the air/fuel ratio control is an electronic fuel injection control which determines the amount of fuel injected into each engine cylinder in turn, the control may operate on a cylinder-by-cylinder basis, so that the air/fuel ratio is controlled independently for each cylinder, while ignition timing is held at the optimum value.

Where the mixture composition control cannot be individually controlled for each cylinder, but the timing can, then the invention may be as follows: For each cylinder, in turn, the timing is perturbed about a baseline value and the engine output is monitored. An adjustment to the baseline value is made for each individual cylinder in accordance with the engine output so as to obtain a desired relationship between timing perturbations and resulting changes in the engine output. An adjustment to the second input (controlling mixture composition) is then made in relation to a function of the adjustments made to the timing in respect of all the cylinders. For example, the second (fueling) input may be varied in accordance with the average value of the timing adjustments. This variation in the second input is made in a sense which will have the effect of reducing the value of this function of the timing adjustments, i.e. in the "average" case, it will reduce the magnitude of the average to close to zero. Thus, the engine will run with the timing for each cylinder optimal for the mixture actually supplied.

Alternatively, instead of using the average timing adjustment, the mixture composition control input could be varied in accordance with the most extreme value of the separate timing adjustments. Thus, an engine control could ensure that only the timing correction adjustment which gave rise to the most advanced timing of the cylinders was taken into account when varying the mixture composition control input. This option could be chosen by a designer who was particularly concerned about the risk of misfires or excessive hydrocarbon emissions resulting in an engine which had a cylinder where the burn rate was particularly slow. Similarly, the most retarded timing correction adjustment could be selected by a designer particularly concerned with the risk of excessive NOx production in an especially fast burning cylinder.

In most engine-operating conditions, the desired relationship between the perturbations and the resulting changes in the engine output is one in which the perturbations in either direction from the base value have the same effect on speed, i.e. a slope of zero on the curve of engine speed versus ignition timing. However, in some conditions, such as during idling, a different relationship may be desirable, that is to say the partial differential $\partial n/\partial T$ (where n is engine speed and T is ignition timing angle) should have some predetermined value other than zero in these conditions.

It is a further object of the present invention to provide a method and control apparatus for improved engine performance without undue complications. Although the present invention is particularly applicable to spark ignition gasoline engines and the illustrative examples described hereinafter all relate to such engines, it is also applicable to compression ignition or diesel engines. In this case, in accordance with either of the embodiments mentioned above, one input is an input to fuel injection timing control and the other input is a mixture composition control of one of the types known in such engines, such as an exhaust gas recirculation control system.

BRIEF DESCRIPTION OF THE DRAWINGS

A more complete appreciation of the invention and many of the attendant advantages thereof will be readily reference to the accompanying drawings, wherein:

FIG. 8 is a layout diagram of the computer program forming part of the control system of FIG. 4;

DETAILED DESCRIPTION OF A PREFERRED EMBODIMENT

Figure 1:
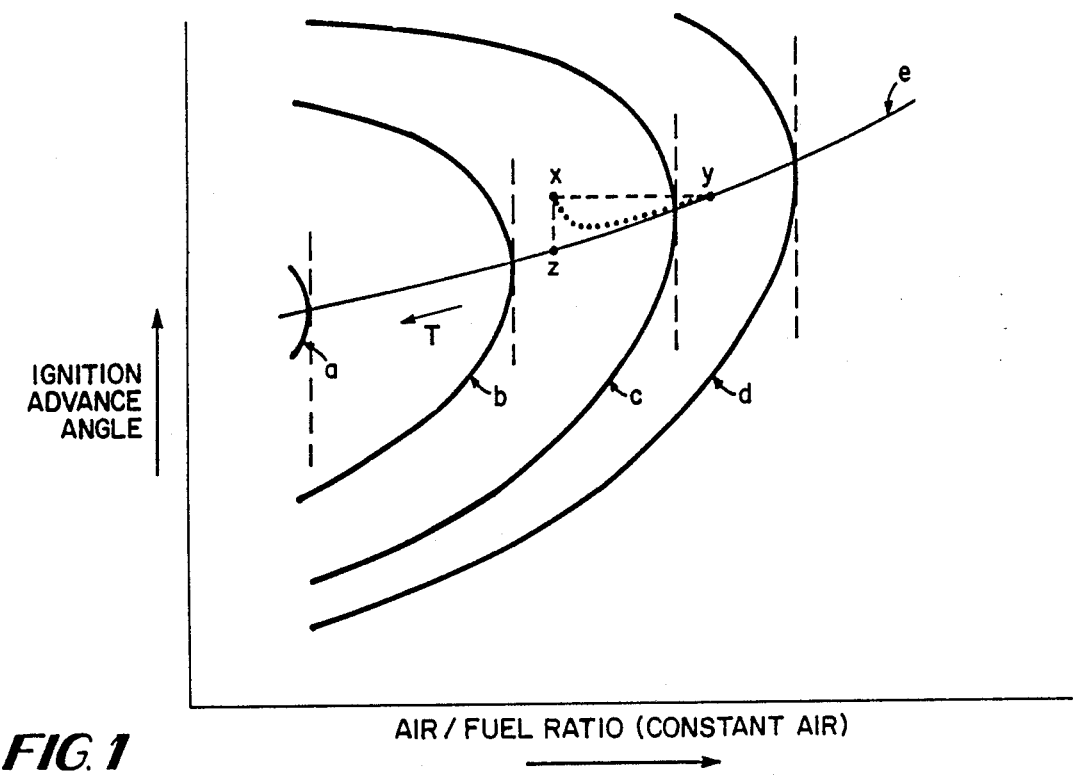
FIG. 1 is a graph in which the ignition angle required to give particular levels of torque is plotted against air/fuel ratio.

Referring now more particularly to the drawings wherein like reference numerals represent like elements, FIG. 1 illustrates graphs a, b, c, d indicating lines of constant torque plotted on axes representing air/fuel ratio and ignition timing angle. These graphs are obtained by running an engine on a test bench at a specific speed and air supply rate and measuring the torque obtained for different values of ignition timing angle and air/fuel ratio. Specifically, the engine is run with the air flow, and ignition timing angles set to specific values and the fuel supplied to and the output load on the engine are adjusted until a specific fuel flow and engine speed are obtained. The torque is then noted. Points on the air/fuel ratio versus ignition timing angle graph at which one particular level of torque is obtained are then joined to provide iso-torque curve d.

Similarly iso-torque curves c, b and a can be drawn for further successively higher levels of torque. At any point in FIG. 1, there is a slope vector which points in the direction of the change which produces the maximum increase in torque. Everywhere along an iso-torque curve the slope vector is at right angles to the curve since travel along the iso-torque curve produces no change in torque. Hence the points at which the iso-torque curves are parallel to the ignition timing (vertical) axis are points at which there is no component of the slope vector in the spark timing direction. The partial differential of torque with respect to spark timing is therefore zero at these points (which have been joined by line e on FIG. 1).

This same procedure can be repeated for other combinations of values of air flow rate and engine speed (similar to FIG. 1) and the family of lines e thus derived, is characteristic of the engine type in question. At points anywhere on FIG. 1 (for the single engine speed and airflow shown) above and to the left of line e the partial differential of torque with respect to ignition timing spark advance is negative, whereas below and to the right of line e it is positive. In the lower right portion of FIG. 1 the charge has not had sufficient time to burn or has not burnt sufficiently quickly to make the maximum possible contribution to the work output of the engine. In the top left portion of FIG. 1 the burn has been completed too early to make the maximum contribution.

Using the results of these tests, for each engine speed and air flow rate, an optimum combination of ignition timing and air/fuel ratio may be selected. The air/fuel ratio is selected so that the mixture is lean enough to prevent generation of excessive amounts of oxides of nitrogen, but sufficiently rich to obtain efficient performance and avoid misfires. Normally, the ignition timing is a point on curve e as such points correspond to maximum torque output. However, under certain conditions a point away from curve e will be chosen. For example, during idling it may be desired to retard the ignition timing so as to reduce the emission of unburnt hydrocarbons. For each selected combination of ignition timing and air/fuel ratio, the slope of engine output with respect to engine speed is also noted.

The recognition of the existence of these characteristics makes it possible to use the "optimum" ignition advance angle as a measure of the existing actual air/fuel ratio (whether or not it has been changed due to a fouled fuel injector, changes in fuel density, etc.) avoiding the need for sophisticated cylinder pressure sensors or flame front ionization sensors. Closed loop control of air/fuel ratio thus becomes possible without great complication since it becomes possible to control the engine to run at optimum ignition timing and a desired actual air/fuel ratio by simple controls. Because in FIG. 1, torque increases when one moves from curve d to a, it can be seen that for a constant air/fuel ratio (vertical dashed lines) there is a single ignition timing angle which provides the maximum torque (intersection of line e with dotted line) and ignition angles above and below this angle will have less than maximum torque. Although FIG. 1 utilized constant airflow with varying amounts of fuel to generate the varying air/fuel ratio, fuel could have been held constant to generate the same air/fuel ratios.

The applicants have found that ignition timing can be established accurately and that the errors which occur when an engine is used are only minimal. In contrast, the factors which affect flame speed such as air/fuel ratio, fuel composition, compression ratio, etc. vary considerably and significant errors do occur when an engine is used. In the present invention, as will be explained in the various examples set out below, the ignition timing value is set to the optimum value for the engine operating conditions. The slope of engine output with respect to ignition timing is measured and the air/fuel ratio is then adjusted until the selected value of the slope is achieved. When this value of the slope is achieved, the flame speed will be at its optimum value and correspond to the particular value of the ignition timing value.

Basic Invention

Figure 2:
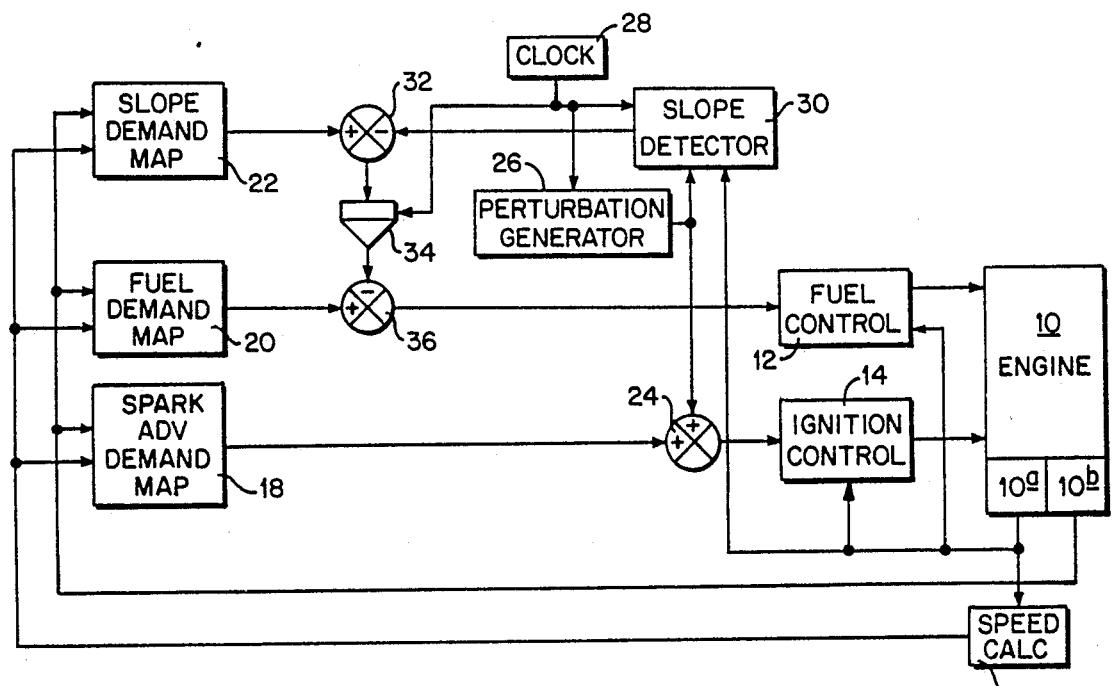
FIG. 2 is a block diagram of one example of a fuel control embodiment of the present invention.

Turning now to FIG. 2, a very simple form of ignition/fuel control of one embodiment of the present invention is shown in block form which makes use of the principle established above.

The term "engine operating parameter" is considered to mean any indicator of the operating condition of the engine and can include, but is not limited to, engine speed, load demand, roughness, torque, exhaust oxygen level, etc. The term "input control parameter" means any input to the engine which, if varied will vary an operating parameter of the engine and can include, but is not limited to, exhaust gas recirculation level, ignition timing advance, fuel injection timing (for diesel engines), fuel/air ratios, etc.

The engine 10 has an electronic fuel control 12 which may, for example, be an electronic fuel injection control of known type in which a separate injector for each cylinder is arranged to inject fuel into the branch of the air intake manifold leading to that cylinder. Injection, as is conventional, is initiated at a specific point in the operating cycle of the engine and the fuel control receives a fuel quantity input signal which determines the duration of injector opening in each cycle and the duration determines the quantity of fuel supplied.

The engine also has an ignition control 14 which, in well-known manner causes the individual spark plugs of the engine to be fired at crankshaft angles determined by a spark angle input to the control 14. Fuel controls and ignition controls suitable for use in the system described are very well-known in the art and the design of such controls will be obvious to those skilled in this art.

The engine 10 has a crankshaft position transducer 10a and another transducer 10b which measures demanded engine power such as throttle valve angle, air intake manifold pressure, etc. The crankshaft position transducer may be a pickup which coacts with a toothed wheel on the crankshaft, suitable means being incorporated to enable a datum position of the crankshaft to be recognized. Such means may be constituted by a circuit (or computer program) to recognize a missing tooth position on the toothed wheel. A suitable arrangement is disclosed in U.S. Ser. No. 625,893 filed June 29, 1984, now abandoned in favor of continuation-in-part application U.S. Ser. No. 899,778, filed Aug. 22, 1986. The crankshaft position signals derived from transducer 10a are supplied to both the fuel control 12 and ignition control 14 as is conventional in this art to enable the fuel injection and ignition operations to be properly synchronized with engine operation. The crankshaft position signal is also supplied to a speed calculator 16 which provides a frequently updated signal representing the current speed of the engine's crankshaft.

These engine speed and load signals are supplied to three "map" type demand signal generators. One of these is a spark advance angle demand map 18 which provides an output representing the ignition advance angle which, for given values of engine speed and load demand will give maximum torque when there is a desired value of air/fuel ratio (which may be chosen with emission considerations in mind). Thus, to derive this desired value of ignition advance angle (when designing the map) a graph like that in FIG. 1 is referred to, and the ignition timing angle on the corresponding line e for the appropriate value of air/fuel ratio is found. Alternatively, the output ignition angle is one which provides a known slope of engine torque with respect to spark timing when there is a desired level of air/fuel ratio.

The second of the maps is a fuel demand map 20 which contains approximate values of the fuel demand signal to be supplied to the fuel control 12 to obtain the required air/fuel ratio at each combination of engine speed and load demand.

The third map is a slope demand map 22 which contains desired values of $\partial n/\partial T$ (where n is engine speed and T is ignition timing angle) for each combination of engine speed and load demand. For most combinations of values of engine speed and load demand, the desired value of the slope is zero, but in some conditions such as at idling (i.e. low speed, throttle closed) a positive slope is required for minimum emissions.

Each of the above-described maps is conveniently in the form of a digital read-only memory in which the signals from the speed calculator 16 (engine speed) and the throttle valve angle transducer 10b (engine load demand) are combined to form an address word and the demand is stored as a word of appropriate length at that memory address.

The ignition timing angle signal (or word) from map 18 is supplied to the ignition control 14 via a summer 24 which also receives a perturbation signal from a perturbation generator 26, which has an input from a clock 28. The perturbation signal in one embodiment is alternately positive and negative and, hence, the ignition timing angle signal supplied to the ignition control 14 is varied periodically to advance and retard the ignition angle by a small amount. The perturbation signal could be a sine wave, sawtooth, squarewave or any other signal as long as it periodically changes the ignition timing.

The perturbation signal is also supplied along with the signals from transducer 10a to a slope detector 30. This detector also has an input from the clock 28 and operates to monitor the effect of the perturbation in ignition timing angle on engine speed. Thus, it produces a signal corresponding to the actual detected change in engine speed for a change in timing angle, i.e. the value of $\partial n/\partial T$. This signal is supplied to an error detecting summer 32 which compares the detected value of $\partial n/\partial T$ with the demanded value derived from map 22 (the value it should have based on engine speed and load demand).

The resulting error signal (which varies in both magnitude and sign in accordance with the relationship between the desired and detected values of $\partial n/\partial T$) is applied to a controller 34, also connected to the clock 28, having, in this instance, an integrator transfer function. The integrated output of controller 34 is applied to a summer 36 which subtracts the output of the controller 34 from the fuel demand signal derived from map 20. The resulting "corrected" fuel demand signal is applied to the fuel control 12. It will be appreciated that other transfer functions for controller 34 could be used, e.g. a proportional plus integral one, etc., so as to increase the speed or stability of the control loop.

It will also be appreciated that controller 34 may take a digital form and that the output of such a controller is a digital "word" such as may be stored in a digital read/write memory and then updated by controller 34 as soon as new slope data is determined. In the embodiment to be described later in FIG. 4, the read/write memory which stores the output of controller 34 is organized as an array addressed by speed and load demand, exactly as are the read-only memories 18, 20 and 22. Each time that the speed and/or load demand change, an appropriate correction, which was determined during the last period of operation under these exact speed/load demand conditions, is immediately available. This appropriate correction is added to the approximate fuel demand from map 20 and forwarded to fuel control 12. Further corrections may then be generated by controller 34, due for instance to a change in the quality of fuel provided. Alternatively, the read/write memory may be a non-volatile memory which serves to remember the controller output when the engine was last shut off. This reduces the engine operating time necessary to return to optimal steady state operation.

Thus, when the engine is running in a mode which does not require retarded timing to meet emissions or knock targets, the ignition timing angle is perturbed about the value which is known to give maximum torque at the required air/fuel ratio. The error signals derived by comparing the detected and desired values (zero) of $\partial n/\partial T$ are integrated by controller 34 and the integral of these error signals is subtracted from the mapped fuel demand signal, thereby adjusting the quantity of fuel injected.

Alternatively, when retarded timing is necessary to meet emissions or knock targets, the ignition timing angle is perturbed about the value which in combination with the desired (positive) value of $\partial n/\partial T$ is known to meet emissions or knock constraint.

The system operates so that if map 22 provides a slope demand signal of zero, and the maps 18, 20 provide ignition angle and fuel demand signals which result in operation at the point "X" on FIG. 1, because of inaccuracies in or outside influences on the system, the fuel flow will be reduced (hence moving the operating point to the right from point "X") until the line e is reached when the slope error will be zero. As a result of this change in air/fuel ratio, engine torque and hence engine speed will decrease, and the signals derived from maps 18, 20 will change, but an equilibrium state will be reached where the slope error is zero and fuel efficient, low emission running will be obtained.

EGR Control Embodiment

Applicants have found that the results of tests with varying amounts of exhaust gas recirculation at constant throttle angle show closely similar characteristics to those displayed in FIG. 1 when plotted with the horizontal axis representing (Air+Exhaust Gas)/Fuel Ratio (hereinafter AEGFR) at constant throttle angle. For an engine where exhaust gas recirculation is used as a means to control mixture composition, the embodiment of FIG. 2 is modified by replacing map 20 by an EGR demand map and fuel control 12 by an EGR control. The EGR demand map contains approximate values of the EGR signal to be supplied to the EGR control to obtain the required EGR at each combination of speed and throttle angle.

The EGR signal may take the form of a simple fraction of the available actuation, an EGR valve position, or a fraction of the available EGR flow, depending on whether the EGR control contains no inner feedback loop, a valve position feedback loop, or an EGR flow feedback loop, respectively. An independent fuel control device such as a carburetor or fuel injection may be used but its operation may not be controlled by the control system which is the subject of this application in the EGR embodiment. Ignition control 14, engine 10 and crankshaft position pickup 10a remain as described previously for FIG. 2. Transducer 10b, in this case preferably measures throttle angle, as will be explained later.

Spark advance angle demand map 18 provides an output representing the ignition angle which, for the current values of engine speed and throttle angle, will give the maximum torque when there is a desired value of AEGFR (which may be chosen with emissions considerations in mind). Alternatively, the output ignition angle is one which provides a known level of slope of engine torque versus timing angle when there is a desired level of AEGFR. The third map 22 is exactly as described in the earlier version for FIG. 2. The summers 24 and 32, the perturbation generator 26, slope detector 30 and controller 34 are all as described for FIG. 2.

The output of controller 34 is however added to the output of the EGR demand map so as to ensure that the mixture is diluted when the detected slope is smaller than the desired slope, indicating a more rapid burn than desired or intended. The integrator in controller 34 is preferably equipped with limits so that no further integration takes place when the output of summer 36 reaches the working limit of the EGR control, even though the error signal that drove the output to the limit persists. This avoids the problem of "integrator wind-up" and ensures that the output of the integrator can move away from the limit quickly if the error polarity reverses.

The maps 18 and 22, and EGR demand map equivalent to map 20 of FIG. 2, are preferably addressed with throttle angle in this case rather than manifold pressure or air mass flow rate so as to avoid problems caused by parasitic control loops. These can arise if the map output influences the EGR and the EGR then affects the addressing parameter (manifold pressure or air mass flow rate) and hence the map output. Throttle angle will not be affected in this way, since the EGR can only influence it through producing torque changes that the driver reacts to. These causes even together are too weak to cause a stability problem.

The invention is thus able to provide feedback control for an EGR-equipped engine. This is especially useful since the EGR valve is liable to change its characteristics as deposits build up over the life of the engine.

Roughness Sensing Embodiment

Figure 3:
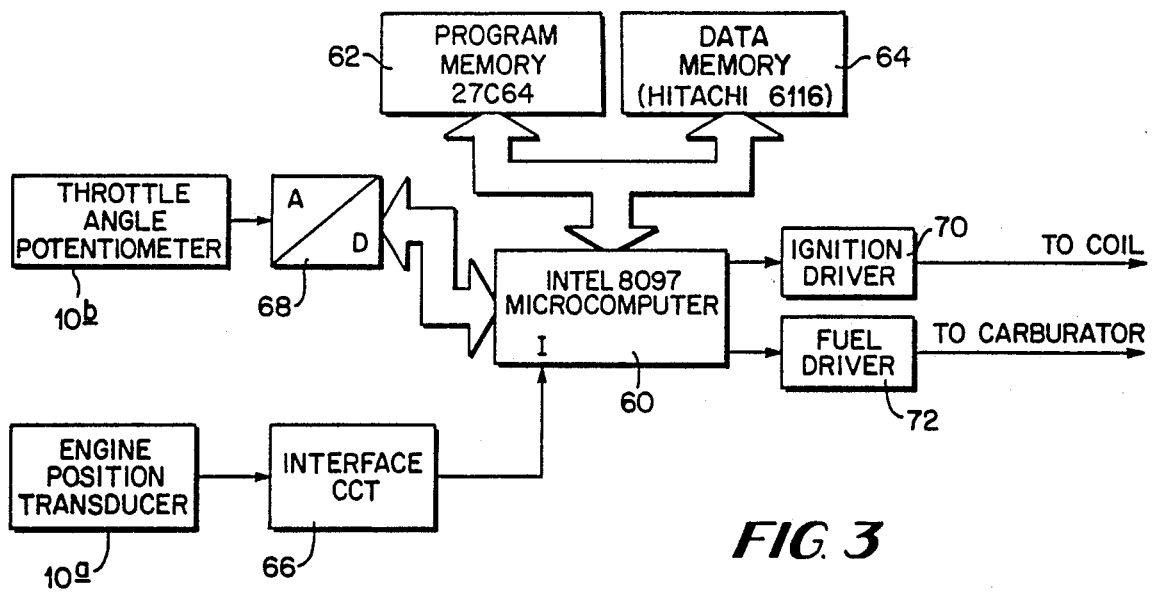
FIG. 3 is a block diagram of hardware which can be used in the example of the invention shown in FIG. 2.

It is known that when comparing the two methods of controlling NOx to a target level, dilution with exhaust gas gives lower engine roughness, but dilution with air gives lower fuel consumption (Ref—20 g/h curve in FIG. 3 of "Lean Mixture or EGR—which is better for fuel economy and NOx reduction?" Nakajima et al Paper C94/79, I Mech E London 1979, herein incorporated by reference).

It is also well-known to measure roughness from measurements of the period of crankshaft rotation intervals (Refs. "Experience with a new method of measuring engine roughness" Latsch et al, Proc. ISATA 1978 Graz, Automotive Automation, London 1978 and U.S. Pat. No. 4,178,891, herein incorporated by reference).

In order to achieve the required low level of roughness, while at the same time maintaining the total level of dilution necessary to produce low NOx emissions, as has been separately explained above for fueling with straight air dilution control and for fueling with EGR dilution control, a further development of the invention is required.

Figure 25:
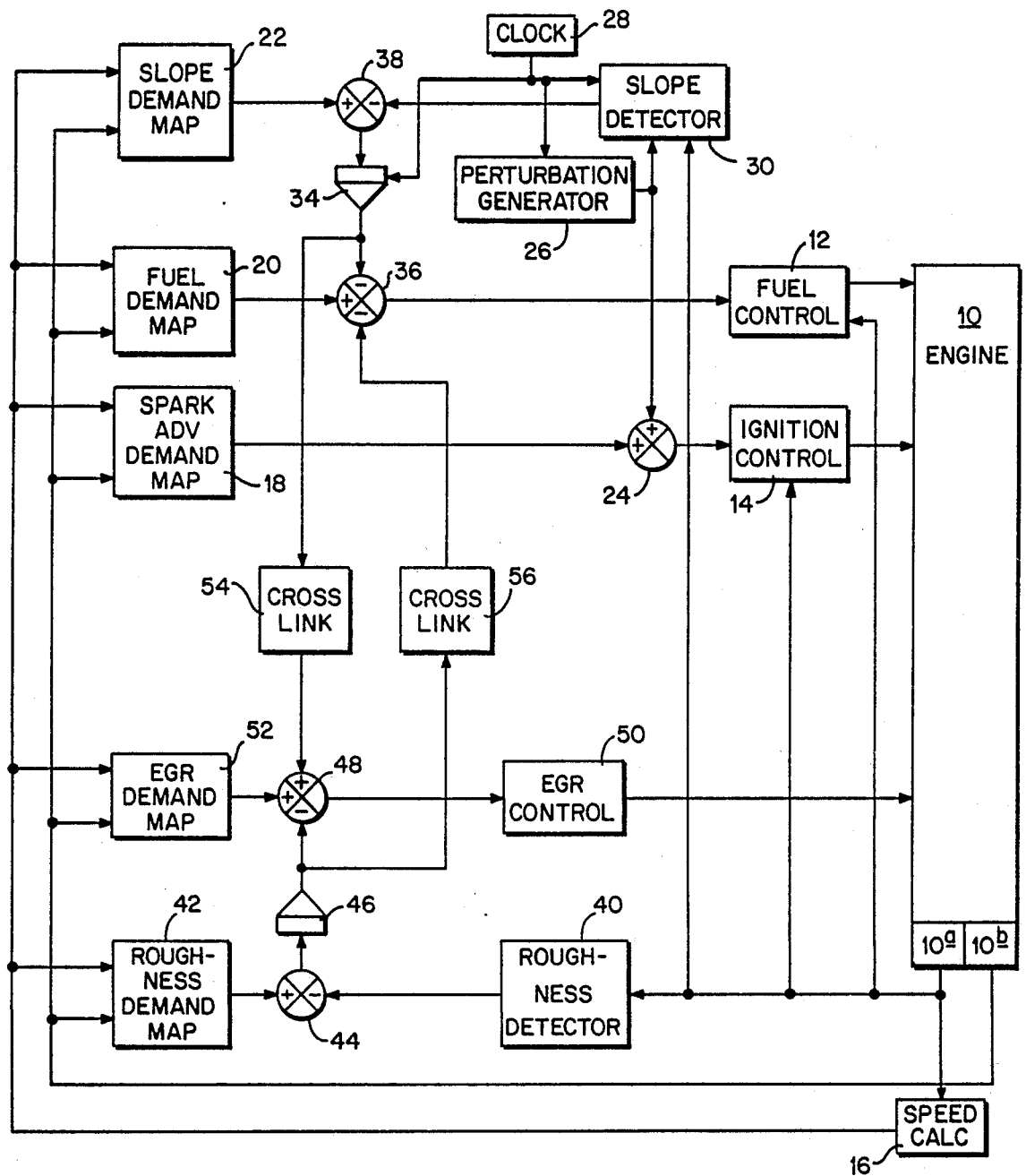
FIG. 25 is a block diagram of a roughness adjustment embodiment of the present invention.

This is shown in FIG. 25 and will now be explained. All the parts of FIG. 2 are present and unchanged. The crankshaft position pickup signals from 10a are additionally fed to a roughness detector 40 of known type, for instance as disclosed in the Latsch paper. A roughness demand map 42 is provided, equivalent to map 22 and addressed as maps 18, 20 and 22. The detected roughness is subtracted from the demanded roughness in a summer 44, equivalent to 32, and the error fed to a roughness controller 46, equivalent to slope controller 34.

As before, excessive slope that persists, indicating that the burn duration is too long, is integrated in the controller 34 and fed via summer 36 to fuel control 12 to reduce the air/fuel ratio. A fixed approximate fuel signal from map 20 is added at summer 36. Similarly, excessive roughness that persists, indicating a need for a higher proportion of EGR in the diluent (and a consequent slower burn speed) is integrated in controller 46 and fed via summer 48 to the EG controller 50 to increase the EGR flow. A fixed approximate EGR signal from map 52 is added at summer 48.

One advantage of the present invention lies in the use of the low cost crankshaft position signal to provide feedback control of both the air/fuel ratio and the EGR. Roughness error is used to control the EGR. Suppose that excessive roughness is experienced—the system will increase the EGR, which in turn is likely to reduce the burn rate and hence the NOx emissions. The slope detector will experience a positive slope in engine output with respect to spark advance and will then cause the air fuel ratio to richen via fuel control 12, bringing the burn duration and hence the NOx and fuel consumption closer to the original target values.

To speed up correction and reduce the risk of unwanted destabilizing interaction between the EGR and fueling loops, deliberate and stabilizing interactions can be added. These consist of extra links 54 and 56 between the output of controller 34 and summer 48, and the output of controller 46 and summer 36, respectively.

Link 54 ensures that corrections to the quantity of diluent in response to slope errors are made by changing the EGR as well as the fueling. Link 56 ensures that corrections to the composition of diluent in response to roughness errors are made by changing the fueling as well as the EGR. Links 54 and 56 may have gain and frequency response characteristics tailored to reduce unwanted interactions on the particular type of fuel control fitted, using the diagonal dominance design method outlined in Rosenbrock HH, "Progress in the design of multivariable control systems", Measurement and Control v4 1971 pp 9-11 (herein incorporated by reference), or otherwise.

In this way, errors in roughness can be fed to both EGR and fueling controllers in such a proportion and with such relative speed to ensure only a very slight effect on slope. Similarly, errors in slope can be fed to both fueling and EGR controllers in such a proportion and with such relative speed to ensure only a very slight effect on roughness.

It will be appreciated that an engine responds very quickly to changes in ignition timing angle and hence it is possible to attain the optimum running conditions obtained as above-described very quickly. However, if the multi-point fuel injection is replaced by an electronically trimmed carburetor or single-point fuel injector, then the engine will respond much more slowly to changes in fueling due to transport delay effects in the inlet manifold. The following more detailed description is based on use of such an electronically-trimmed carburetor.

Hardware Implementation

The FIG. 2 embodiment is preferably implemented utilizing a micro-processor type control as shown in FIG. 3. Micro-processor based ignition and fuel controls are already well-known and the present invention may be implemented by merely changing the programming in some existing systems. The maps 18, 20, 22 can be readily implemented in the microprocessor Read Only Memory (ROM) while the perturbation generator is timed by a software counter. The generator output is added to the ignition advance angle word from map 18. The slope detector calculates the slope $\partial n/\partial T$ by reference to successive measurements of the engine speed stored in the micro-processor Random Access Memory (RAM). The integrator 34 is a register incremented or decremented periodically in accordance with the difference between the demanded and calculated values of the slope $\partial n/\partial T$.

As shown in FIG. 3, actual hardware for a system in accordance with one embodiment makes use of a microcomputer 60 which may be in the form of an Intel integrated circuit type 8097 (available from Intel Corp., Santa Clara, Calif.) which is connected conventionally to a program memory 62, (for example ROM Type 27C64 available from Intel) which contains all the programs required for the microcomputer and the maps 18, 20 and 22. Temporary data storage is provided in RAM 64 (for example Hitachi Type 6116 available from Hitachi America Ltd., San Jose, Calif.).

The transducer 10a can employ a toothed wheel having teeth at 10° intervals. A winding of this transducer is interfaced with the interrupt input of the microcomputer 60 via an interface circuit 66 which operates mainly to filter out noise and provide clean squared pulses to the microcomputer input as each tooth passes the pick-up winding. As explained in GB-A-No. 2142436, these pulses are used to provide crankshaft position pulses at 10° intervals and reference pulses at two specific positions in each crankshaft revolution. The microcomputer uses these pulses to calculate the engine speed (i.e. the speed calculator 16 function is performed by the microcomputer program). The transducer 10b is a potentiometer mechanically connected to the throttle spindle of the engine and this is interfaced via an analog-to-digital converter 68 with the microcomputer 60.

The computer 60 provides an output to an ignition coil driver module 70 and a fuel driver module 72. The ignition driver module can provide a fixed dwell angle control (of preferably 110°) and is implemented by two levels of software. One level carries out the various calculations involved and the other implements coil turn-on and turn-off at the calculated angles. The implementation software runs in real time, that is, each time a signal from the transducer 10a is received. Since the engine position resolution is 10°, finer resolution is obtained by dead reckoning between the 10° position fixes, based on the time taken for the previous 10° interval. A high speed output of the microcomputer is scheduled to drive the ignition coil on and off. A further more precise level of control of the build-up of ignition coil current is provided by the hardware dwell control circuit 74 to be described later with respect to FIG. 7.

Air/fuel ratio control is achieved utilizing a General Motors carburetor (type 14032365) fitted with a mixture control solenoid which is driven by a pulse width modulated (PWM) signal at 10 Hz allowing the air/fuel ratio (AFR) to be varied. The clock provides time information used to generate the period of the PWM signal and a register, which holds the output of summer 36, provides the percentage of that period for which the PWM signal is to be high. Another high speed output of the microcomputer is used to drive the solenoid via a suitable amplifier.

Motor Vehicle Installation

Figure 4:
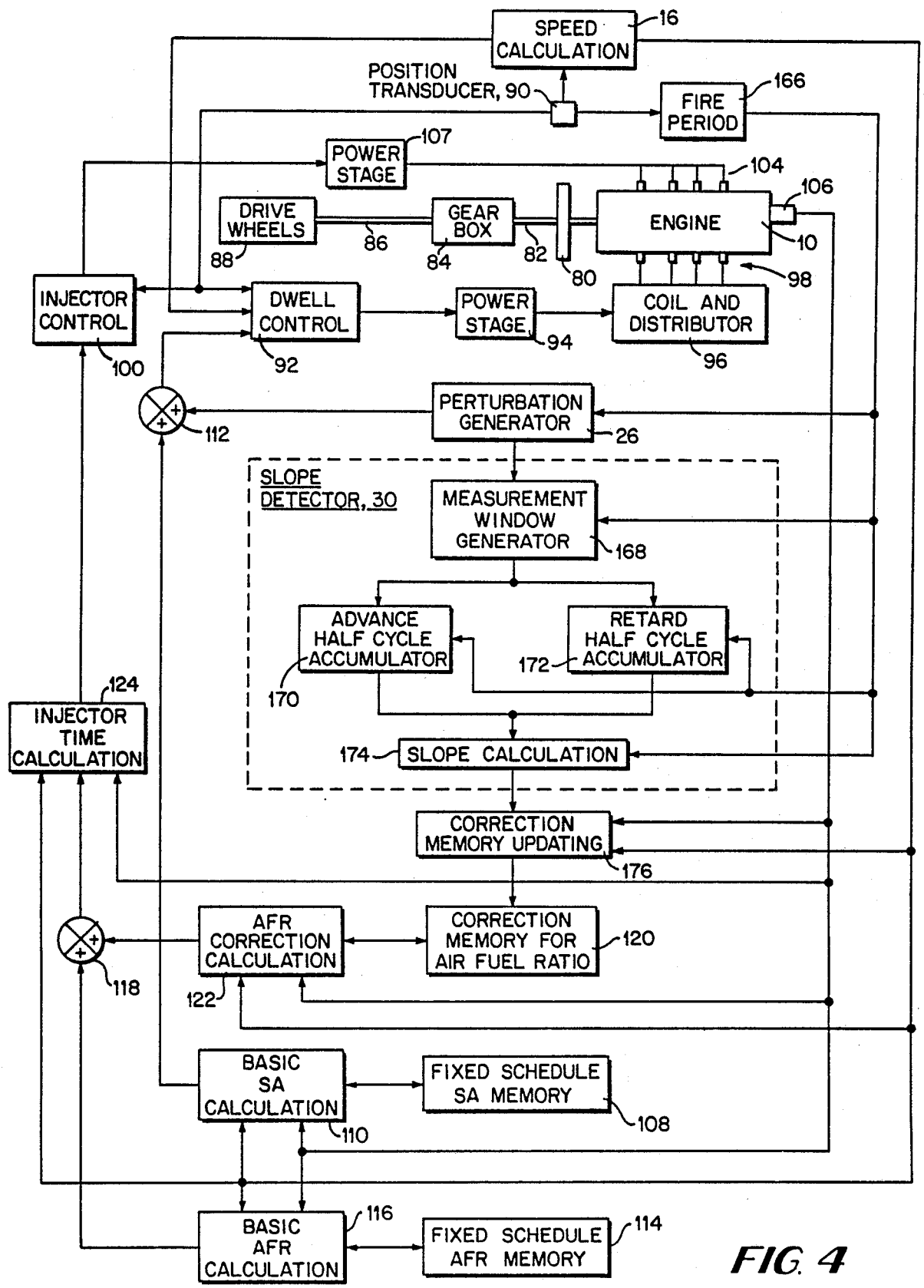
FIG. 4 is a diagram of the functional components of an adaptive control system embodying this invention.
Figure 26:
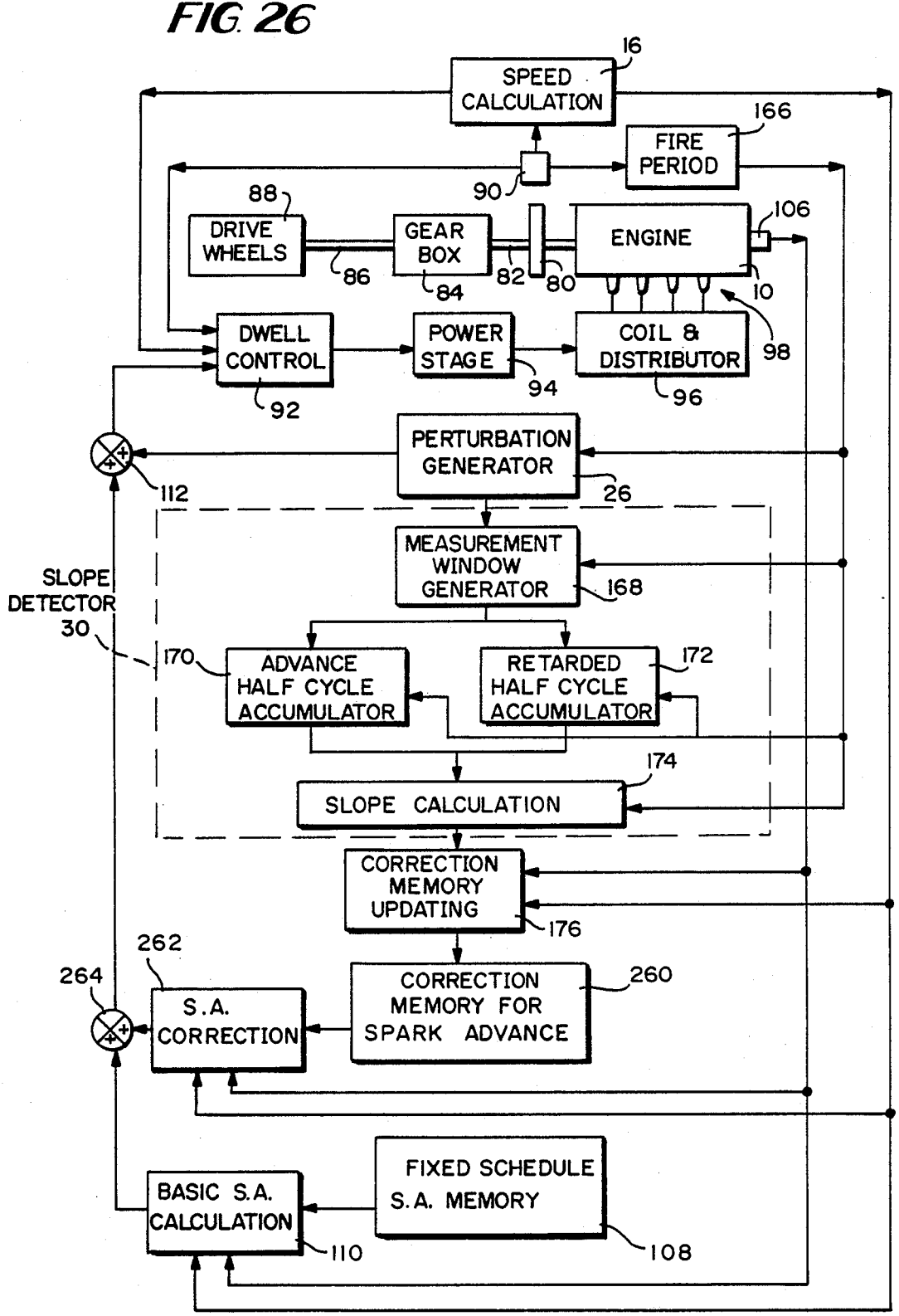
FIG. 26 is a diagram of the functional components of our adaptive control system in accordance with another embodiment of the present invention.

Referring now to FIGS. 4 and 26 (identified reference numbers indicate similar elements operating in similar fashion), there is shown in functional form an adaptive control system embodying different aspects of this invention and installed in a motor vehicle. In both Figures the control system comprises a four cylinder fuel injected spark ignition internal combustion engine 10 which is provided with a flywheel 0. The engine 10 is installed in a vehicle and is connected through a resilient shaft 82, a gear box 84, and a further resilient shaft 86 to drivewheels 88 which form a load. Although not shown, a clutch is also provided.

The flywheel 8 is associated with a position transducer 90 which produces a reference pulse for each 180° of rotation of the engine crankshaft. Each pulse is produced when the piston in the cylinder executing an expansion stroke is at 30° after the top dead center position. The pulses from transducer 90 are supplied to a dwell control means 92, the output of which is connected through a power stage 94 to a coil and distributor 96. The coil and distributor 96 is connected to four spark ignition plugs 98 and causes ignition sparks to occur in these plugs at appropriate moments. The output of transducer 90 is also supplied to an injector control means 100, the output of which is connected through a power stage 102 to the injectors 104. The output of transducer 90 is also supplied to a speed calculation means 16 which calculates engine speed and supplies this to the dwell control means 92.

The engine is provided with a transducer 106 which measures the requested or demanded load on the engine. In the present example, the transducer 106 measures the absolute pressure in the inlet manifold for the engine. The load demand could also be detected by measuring other quantities such as the throttle valve opening position, the rate of air flow into the inlet manifold, etc.

The system also includes a memory 108 in which is stored a two-dimensional array of spark advance angles, the abscissa and ordinate of the array corresponding to engine speed and load demand. The memory 108 speed calculation means 16 and transducer 106 are connected to basic spark advance calculation means 110. For each prevailing engine speed and load demand, the calculation means 110 calculates a basic value for spark advance and supplies this to one input of a summer 112. The calculation means 110 calculates this basic value from the spark advance values stored in the array in memory 108 at the four points in the speed/load plane surrounding the prevailing engine speed and load demand. Each of these values is multiplied by an appropriate weighting factor and the four resulting values are added to provide the basic spark advance value. Thus, the calculation means 110 calculates the basic spark advance value by interpolation. The spark advance values are stored in memory 108 at a density sufficient to provide a reasonably accurate value in view of irregularities of the true optimum spark advance characteristics of the engine 10. The spark advance values in memory 108 may take the form of a fixed schedule which has been established from rig-tests on sample engines.

In FIG. 4 which is directed toward perturbing spark advance and thereby controlling air fuel ratio, the system also includes a memory 114 in which is stored a two dimensional array of air/fuel ratios, the abscissa and ordinate of the array corresponding to engine speed and load demand. The memory 114 and the speed calculation means 16 and transducer 106 are connected to air/fuel ratio (AFR) calculation means 116. For each prevailing engine speed and load demand, the AFR calculation means 116 calculates a basic value for air/fuel ratio and supplies this to one input of a summer 118. The AFR calculation means 116 calculates this basic value from the air/fuel ratio values stored in the array in memory 114 by the interpolation method as discussed previously with respect to the spark advance calculation means 110.

The air/fuel ratio values in memory 114 take the form of a fixed schedule which is established from rig-tests on sample engines. For the various reasons which have been outlined above, the optimum air/fuel ratio values for the operating engine will differ from those values stored in memory 114.

Additionally, errors will arise in providing the demanded air/fuel ratio as output from summer 118, due, for instance, to the drift of injector characteristics over time.

As will shortly be described in detail, the system imposes small positive and negative perturbations on the spark advance value and senses the change in engine output speed which these cause. From the change in engine speed, correction values for the demanded air/fuel ratio are determined and stored in a correction memory 120. These corrections may represent genuinely better air/fuel ratios for NOx control or corrections to the demanded air/fuel ratio to compensate for errors that may arise in producing that ratio. These correction values are also stored as a two dimensional array in which the abscissa and ordinate represent engine speed and load demand and they are stored with the same density as the values stored in memories 108 and 114.

For the prevailing engine speed, a correction value is calculated in an AFR correction value calculation means 122 and supplied to a second input of summer 118. The calculation means 122 receives the outputs of speed calculation means 16 and load demand transducer 106 and calculates the correction value for the prevailing engine speed from the values stored in memory 120 by using the same interpolation method as that used by the calculation means 110 and 116.

Injector time calculation means 124, receives the outputs of the summer 118, the load demand transducer 106 and speed calculator means 16 and calculates the injector "on" time necessary to maintain the air/fuel ratio demanded by the output of the summer 118.

The perturbation values are determined in a perturbation generator 26 and supplied to an input of summer 112. The other input of summer 112 receives the output of spark advance calculation means 110, and the output of summer 112 is supplied to the dwell control means 92 as a command value for the spark advance. The dwell control means 92 uses the output of the speed calculation means 16 and position transducer 90 to ensure that ignition sparks occur at the commanded spark advance values.

The output of the injector time calculation means 124 is supplied to the injector control means 100 as a command value for injector on time. The injector control means 100 uses the output of position transducer 90 to ensure that the fuel injections are synchronized correctly to the revolutions of the engine 10.

FIG. 26 is directed toward perturbing spark advance and thereby controlling spark advance through a unique slope calculation and/or interpolation calculation. For various reasons which have been outlined above, the optimum spark advance values will differ from those stored in memory 108. As will shortly be described in detail, the system imposes small positive and negative perturbations on the spark advance value and senses the change in engine output speed which these cause. From the change in engine speed, correction values are stored in a correction memory 260. These correction values are also stored as a two dimensional array in which the abscissa and ordinate represent engine speed and load demand and they are stored with the same density as the values stored in memory 108.

For the prevailing engine speed, a correction value is calculated in a correction value calculation means 262 and supplied to a second input of summer 264. The calculation means 262 receives the outputs of speed calculation means 16 and load demand transducer 106 and calculates the correction value for the prevailing engine speed from the values stored in memory 260 by using the same interpolation method as that used by the calculation means 110.

In both FIGS. 4 and 26, because combustion occurs intermittently in the spark ignition engine, the torque output of engine 10 fluctuates during each engine cycle. In order to smooth these fluctuations, the flywheel 80 is provided and it converts the fluctuations in torque into small accelerations and decelerations. The resilient nature of shafts 82 and 86 prevent these small accelerations and decelerations from causing changes in the speed of drivewheels 88.

The flywheel 80, shafts 82 and 86, and the gear box 84 form a resonant system. The resonant frequency varies with the gear ratio established in the gear box 84. In one example, the system has a resonant frequency of 4Hz in second gear and 9 Hz in fourth gear.

Every single perturbation in the spark advance angle causes a change in output torque produced by engine 10. In view of the resonant nature of flywheel 80 and shafts 82 and 86, the resulting change in the speed of flywheel 80 has two components. The first of these components is a damped ringing response at the appropriate resonant frequency and, in the particular engine mentioned above, the ringing decays with a time constant of 0.3 seconds. The second component is the longer term response which is associated with the new steady state which arises when the change in resistance forces caused by the change in vehicle speed matches the change in torque from the engine. With the particular engine discussed above, this second component has a time constant of 7 seconds in fourth gear.

In order to measure the slope of engine output with respect to spark advance as quickly as possible, the first part of the response should be used to calculate the slope. It is also desirable to provide a system which will work in any gear and which will provide comparable results in the different gears without knowledge of which particular gear is engaged.

EGR Embodiment

Figure 24:
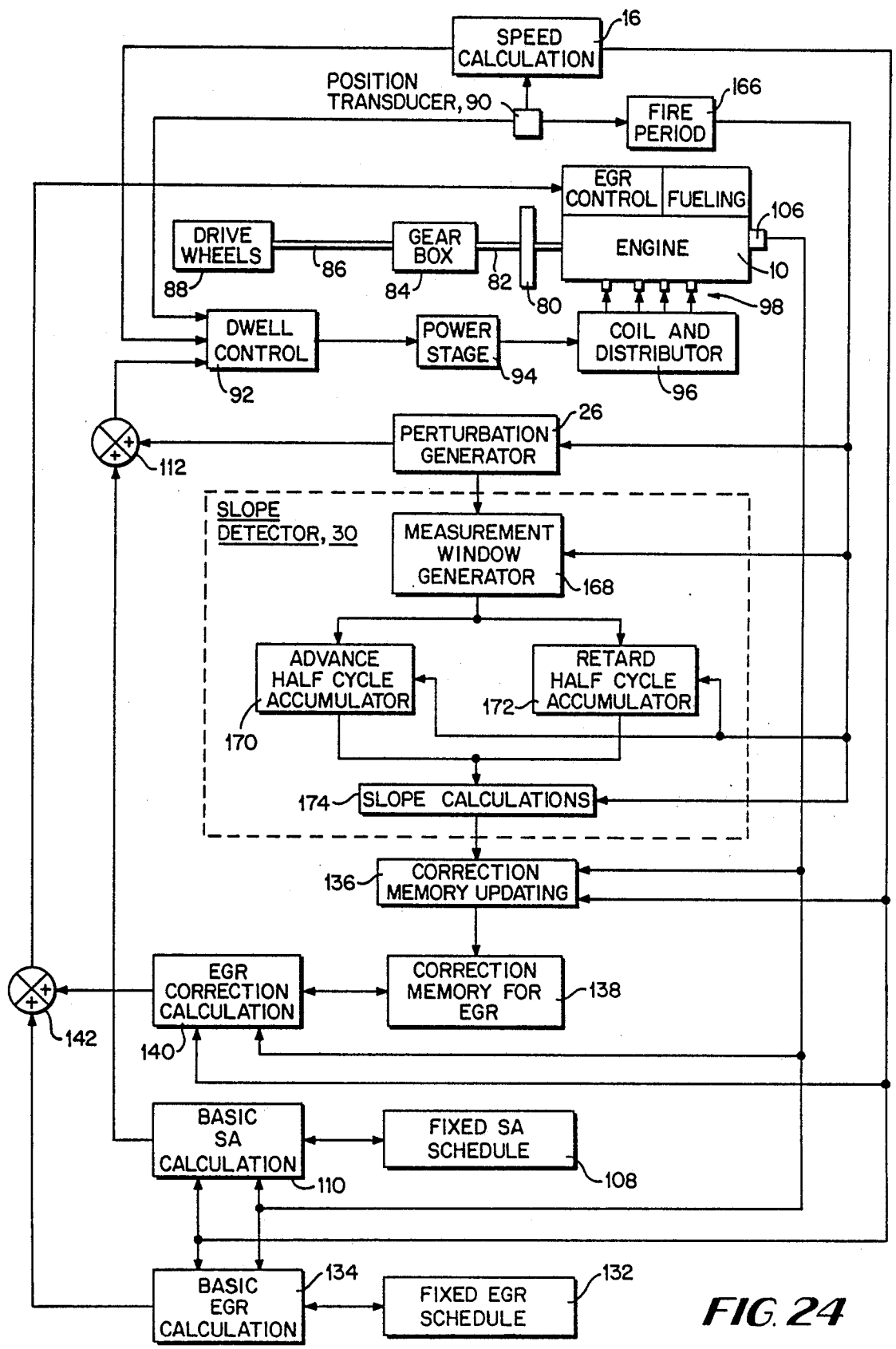
FIG. 24 is a functional block diagram for an exhaust gas recirculation control embodiment of the invention.

FIG. 24 is a functional block diagram for the EGR control embodiment corresponding to FIG. 4 for the fuel injection embodiment. Items 80–98 remain as in FIG. 4. Injectors 104, power stage 102, and control means 100 are absent, and their place is taken by an independent fueling control 130 the operation of which could but does not have to be directly affected by this embodiment of the invention. Speed calculation means 16 is unchanged from FIG. 4. Load demand transducer 106 is preferably responsive to throttle valve angle as was explained above for the corresponding item 10b in FIG. 2. Fixed spark advance calculating means 110 and memory 108 are unchanged from FIG. 4.

The system also includes a memory 132 in which is stored a two-dimensional array of EGR demand values, and a calculation means 134 to provide the basic EGR demand by interpolation between the empirically derived values stored in memory 132.

Exactly as in FIG. 4, correction values are calculated as the engine operates. The slope information from slope detector 30 is converted to a memory update signal in updating block 136. This is used to update the EGR correction data held in an array in memory 138, and interrogated by calculation means 140, in an analogous fashion to the AFR correction memory 120 and AFR correction value calculation means 122 in FIG. 4. The basic EGR demand from 134 and the EGR correction from 140 are summed in summer 142 and forwarded to EGR control 144 where they take effect on the engine.

Figure 7:
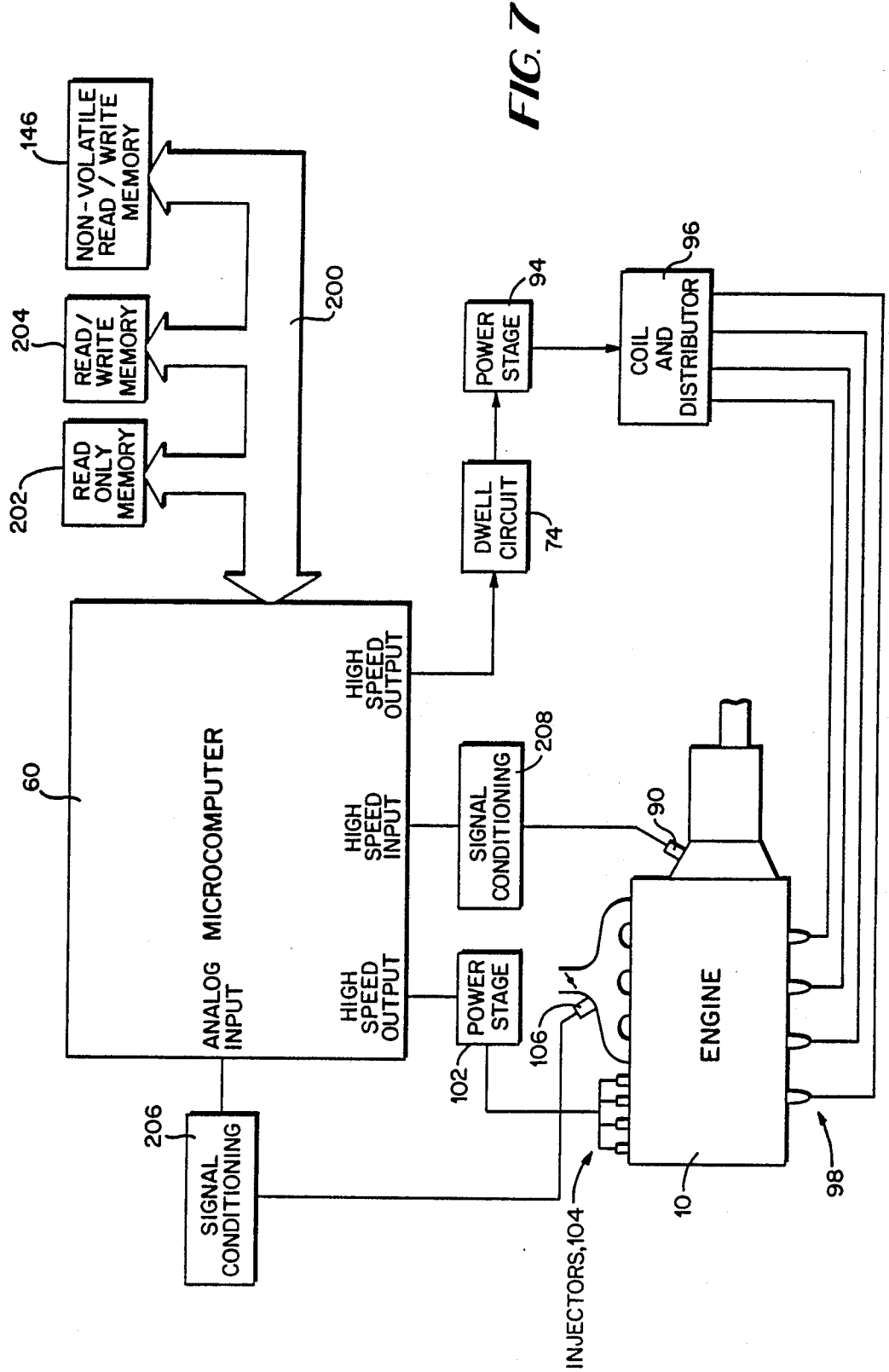
FIG. 7 is a block diagram of a microcomputer arrangement which implements the functional components of FIG. 4.

The microcomputer arrangements used correspond exactly to those to be described for FIG. 7, except that the corrections stored in memory 146 are to EGR, and the second high speed output of the microcomputer is used to drive the EGR valve rather than injectors.

The general arrangement of the program modules and the data flow follow the pattern illustrated in FIG. 8 (discussed in detail later), except that the fixed air fuel ratio schedule 160 is replaced by a fixed EGR demand schedule corresponding to memory 132 of FIG. 24, and air fuel ratio correction schedule 162 is replaced by an EGR correction schedule corresponding to memory 138 of FIG. 24. Air fuel ratio would be replaced by EGR throughout the description of FIGS. 8 and 10–19.

Figure 5:
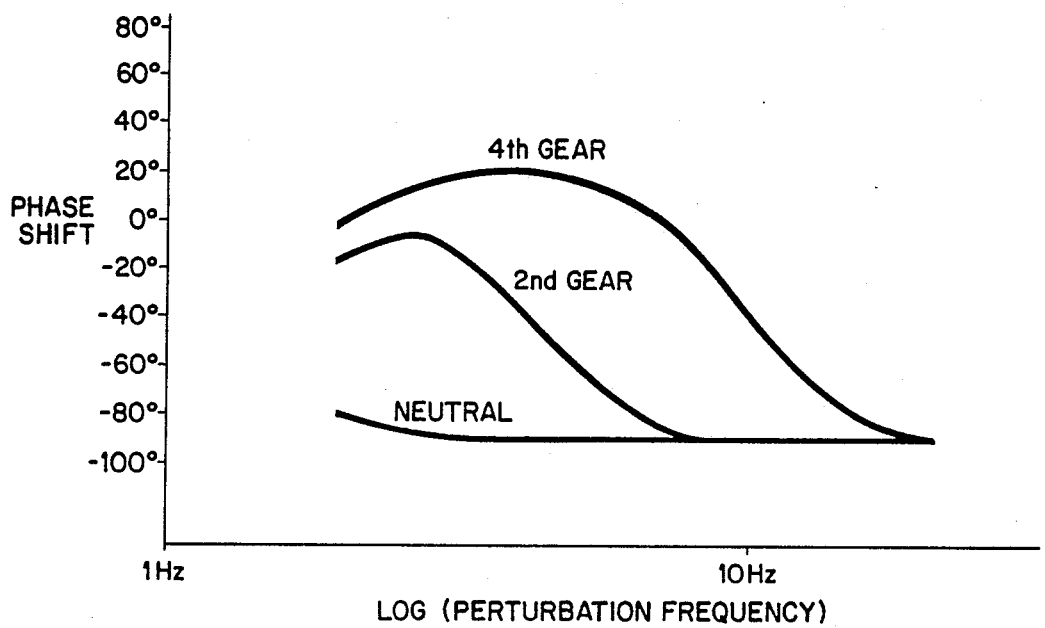
FIG. 5 is a graph illustrating the phase lag between a perturbation wave form and the resulting change in engine speed as a function of perturbation frequency.

In FIG. 5, there is shown a graph of the phase shift between a perturbation wave form generated by perturbation generator 26 and the resulting change in engine speed as a function of perturbation frequency for fourth gear, second gear and neutral. As may be seen, the phase shift changes rapidly with frequency in the region below the 10Hz and there are also large differences between the phase shift in the different gears. In contrast, the in region above 10Hz, the phase shift changes slowly with frequency and the differences in phase shift in the different gears are small. With increasing frequency for all gears, the phase shift approaches the 90° phase shift obtained when neutral is engaged. In order to provide comparable results in the different gears, it is therefore preferred that the perturbation frequency produced by perturbation generator 26, as shown in FIG. 4, is greater than the highest resonant frequency of the resonant system formed from flywheel 80, shafts 82 and 86 and gear box 84. In the present case, this means the perturbation frequency should be greater than 9Hz which is the resonant frequency in fourth gear. However, in other engines, the phase changes below the resonant frequency may be smaller than those shown in FIG. 5 and it is anticipated that, for some engines, satisfactory results could be obtained with a perturbation frequency equal to or greater than three quarters of the highest resonant frequency.

There is a further restraint on the perturbation frequency produced by perturbation generator 26 as shown in FIG. 4. Perturbations in the spark advance value can only take effect at the moments when ignition is initiated. In the case of a four cylinder engine, this occurs twice for each revolution of the crankshaft. Therefore, the perturbation frequency cannot take a fixed value. Therefore, perturbation generator 26 generates a two level wave form at a frequency which is greater than a minimum frequency (such as the resonant frequency or three quarters of the resonant frequency) and with a period which is equal to a whole number of ignition firing periods of engine 10. During the first part of each period, the perturbation generator 26 sets the perturbation value so as to cause a small increase in the spark advance angle and, in the second part of each period, it sets the perturbation value so as to cause a small decrease in the spark advance angle.

The output of position transducer 90 is supplied to a fire period calculating means 166 which calculates each fire period. Position transducer 90 produces a reference pulse when the respective piston is at 30° after top dead center. Thus, the actual period calculated is the period which elapses between these pulses. The fire period is supplied to the perturbation generator 26 and also to the slope detector 30 which comprises a measurement window generator 168, an advance half cycle accumulator 170, a retard half cycle accumulator 172, and slope calculation means 174.

The measurement window generator 168 receives the wave form from perturbation generator 26 and creates a series of contiguous positive and negative measurement windows, each of which corresponds to a respective first part or second part of a period of the perturbation wave form. The measurement windows are shifted in phase from the perturbation wave form by an amount which is a compromise of the actual phase shifts between the perturbation wave form and the engine response which occurs in the various gears. These actual phase shifts have been described with reference to FIG. 5. In the present example, this phase shift is 72°, i.e. 0.2 of a perturbation cycle. The positive and negative measurement windows are supplied respectively to the advance and retard half cycle accumulators 170 and 172.

Figure 6:
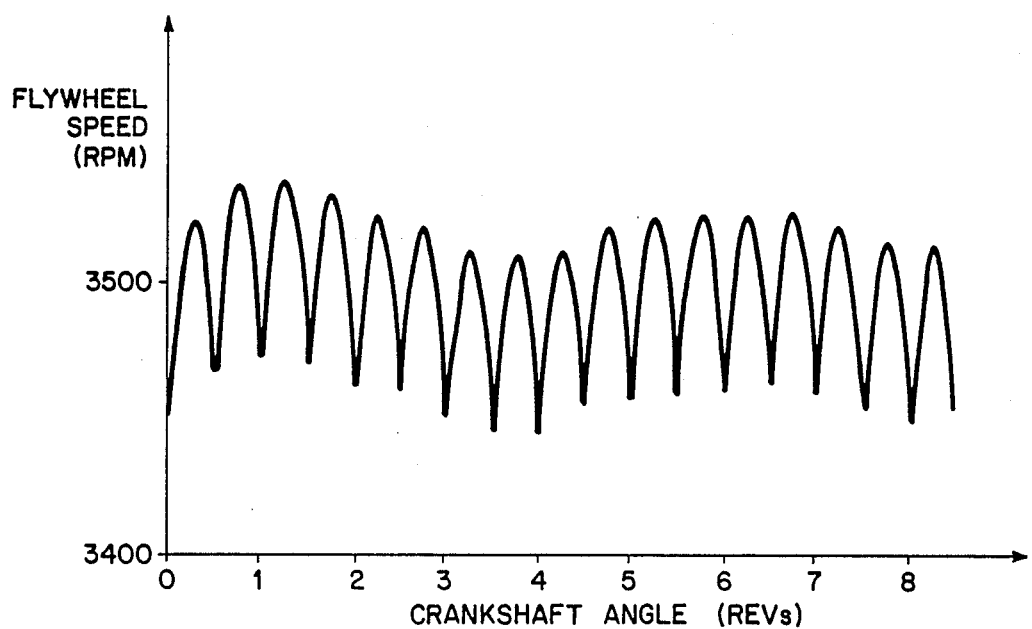
FIG. 6 is a graph of engine speed as a function of crankshaft angle.

Referring now to FIG. 6, there is shown the variation in the speed of flywheel 80 as a function of crankshaft angle. As may be seen during each engine cycle, severe fluctuations occur. There is therefore a danger that the severe fluctuations in engine speed could confuse measurements of the change in engine speed caused by the perturbations to the spark advance angle. In order to avoid this danger, the engine speed is sensed by measuring the period for whole engine fires only, i.e. for 180° of crankshaft rotation for a 4-cylinder, 4-stroke engine. Specifically, engine fire periods whose central points fall in the positive and negative measurement windows are accumulated respectively in the advance and retard half cycle accumulators 170 and 172.

As mentioned above, the slope of engine output with respect to spark advance is calculated in the slope calculation means 174. Following each measurement window, the average engine speed during that window is measured from the accumulated fire periods. Following each positive measurement window, the effect of the transition from the part of the period in which the spark advance angle was decreased to the part of the period in which it was increased is evaluated by subtracting the average speed during the negative measurement window from the average speed during the positive measurement window. Similarly, at the end of each negative measurement window, the effect of the transition from the part of the period in which the spark advance was increased to the part of the period in which it was decreased is evaluated by subtracting the average speed during the positive measurement window from that during the subsequent negative measurement window. Thus, these two transition values are evaluated alternately. These two transition values reflect both the change in torque generated by the perturbations and also the change in speed due to any acceleration or deceleration which is caused, for example, by movement of the accelerator by the driver or by changes in resistance forces or road gradient. In order to eliminate the effect of acceleration or deceleration from the slope measurement, the slope is then evaluated by subtracting the transition value associated with changing the perturbation from an increased value to a decreased value from the transition value associated with changing the perturbation from a decreased value to an increased value.

The curve relating torque output to spark advance has a single maximum at which the slope of engine output with respect to spark advance will be zero. As will be explained in the present example, the air/fuel ratio is corrected with the intention of achieving this maximum. However, in some engines under high load, the spark advance angle which causes maximum output may also permit knocking to occur. Also, in some engines, the maximum may be associated with undesirable exhaust emissions. Therefore, for some engines, it may be required to vary the air/fuel ratio until the slope reaches a predetermined value other than zero, but it should be noted that the embodiment of FIG. 4 does not include this refinement.

Referring now again to FIG. 4, the slope calculated by the slope calculation correction means 174 is supplied to correction memory updating means 176. The means 176 also receives the engine speed and load demand from the speed calculation means 16 and load transducer 106. For each slope measurement, the updating means 176 updates the values stored in memory 120 for each of the four array points surrounding the prevailing engine speed and load demand. Specifically, for each array point a new correction is calculated and stored from the old correction n accordance with the following formula:

new correction = old correction + k × (weighting factor) × (slope)

where $k_1$ is a constant.

This formula corrects the values in the memory 120 from the slope measurements by integration and smooths out the noise component in the slope measurements. The constant $k_1$ should be chosen so as to be small enough to reduce these noise components to a low level but large enough to provide rapid convergence to the optimum air/fuel ratio. The weighting factor given in this formula is the same as the weighting factor used by the calculation means 110, 122 and 116. The method of calculating the weighting factor will be described in detail below.

As the density of array points in the memories 108 and 114 are chosen to give a good match with the optimum spark advance and air/fuel ratio characteristics, the information in the slope measurements will represent a mismatch which has occurred between the "real world" actual optimum characteristics and those stored in the memory 114. It is therefore reasonable to update memory 120 by a process which is symmetrical with the interpolation process used to derive the spark advance angle and air/fuel ratio and the formula given above achieves this. Furthermore, in the formula given above, the values stored in memory 120 are corrected in proportion to the magnitude of each slope measurement and so maximum advantage is taken of the information present in each slope measurement.

The combination of the rapid method of making slope measurements which is achieved by using the first component of the engine speed response and the formula given above for updating memory 120 will permit the air/fuel ratio to be corrected to its true optimum value for the complete range of engine speed and load demands in approximately six hours of driving a motor vehicle in mixed road conditions. This is relatively long compared with the average time for each operation of an engine. Memory 120 which contains a complete schedule of updated corrections addressed by speed and load demand is therefore preferably of a non-volatile type construction, so as to retain the corrections between periods of engine operation.

Two further refinements to the formula given above for updating memory 120 will now be described. In addition to the mismatch in the air/fuel ratio for the prevailing speed and load demand, each slope measurement may also contain information which refers to the whole speed/load demand plane. For example, there may be a mismatch for air/fuel ratio across the entire plane due, for example, to changes in barometric pressure. In order to take advantage of this information, each slope measurement may be used to update all the correction values in memory 120 of FIG. 4 in accordance with the following formula:

new correction = old correction + $k_2$ × (slope).

Alternatively, this formula may be used to update a single value which is added at summer 118 to the correction value calculated by calculation means 122. The constant $k_2$ is of course much smaller than the constant $k_1$ mentioned above. However, the constant $k_2$ must be chosen to be large enough to give convergence for changes in variables such as a barometric pressure in a few minutes across the entire load/speed plane.

The second refinement enables the entire air/fuel ratio characteristics to be tilted and this may be required, for example, when the load transducer is poorly calibrated or subject to drift. With this second refinement, four offset correction values are stored in an additional memory corresponding to the four corners of the speed/load plane. Each slope measurement is then used to update these four values by multiplying the slope by an appropriate weighting factor and an appropriate constant. In calculating each correction value, these four offset values are then multiplied by appropriate weighting factors and the resulting value is added to the value calculated from the four nearest array points surrounding the prevailing engine speed and load demand.

FIG. 4 Hardware

The various functional blocks shown in FIGS. 4 and 26 are implemented using a microcomputer arrangement and this arrangement is shown in FIG. 7 which is a more detailed description of the hardware discussed and shown in FIG. 3. The microcomputer arrangement comprises an Intel Corporation 8097 microcomputer 60 which is connected via a data and address bus 200 to a type an Intel-type 27C64 read only memory 202, a Hitachi type 6116 read/write memory 204, and a Greenwich Instruments type NVR2 non-volatile read/write memory 146 (available from Greenwich Instruments Limited, Sidcup, Kent, England). The program and fixed schedules are stored in memory 202, temporary variables are stored in memory 204, and the corrections for the air/fuel ratios are stored in memory 146.

The microcomputer arrangement implements the speed calculation means 16, the fire period calculation means 166, the perturbation generator 26, the measurement window generator 168, accumulators 170 and 172, slope calculation means 174, updating means 176, the memories 108, 120 and 114, together with the calculation means 110, 122, 116 and 124, summers 118 and 112, part of dwell control means 92, and injector control means 100.

The load demand transducer 106 is connected through a conventional signal conditioning circuit 206 to an ANALOG input of microcomputer 60. The position transducer 90 is of the variable reluctance type and coacts with a toothed wheel mounted on the engine crankshaft and from which a tooth has been removed to establish the required reference position. Transducer 90 is connected through a signal conditioning circuit 208 to a HIGH SPEED input of microcomputer 60.

A HIGH SPEED output of microcomputer 60 is connected to the input of a dwell control circuit 74. The dwell control circuit 74, together with part of the program stored in memory 202, performs the function of the dwell control means 92 of FIG. 4. The dwell control circuit 74 can be a type L497 dwell control circuit supplied by S.G.S. Limited (Phoenix, Arizona). The dwell control circuit 74 initiates the build up of current in the primary winding of the ignition coil at the correct moment to achieve the required level just before the current is interrupted. The dwell control circuit 74 also limits the coil current to the required level during the short period which elapses between achieving the required current and the current being interrupted. The output of dwell control circuit 74 is connected to the power stage 94 which, as mentioned with reference to FIG. 4, is connected to the input of the coil and distributor 96. Another HIGH SPEED output of microcomputer 60 is connected to power stage 102 which is connected to the inputs of the injectors 104 although this would be unnecessary in the FIG. 26 embodiment.

Software Programming

Referring now to FIG. 8, there is shown the general arrangement o the sub-routines or modules which form the program for the microcomputer and also the flow of data between these sub-routines or modules. The program comprises the modules MISDET, IGNLU, SAFIRE, and DWELL. The module IGNLU calls a submodule LOOK UP and the module SAFIRE calls submodules MAP STORE and LOOK UP CORRECTION. FIG. 8 also shows a fixed spark-advance schedule 164 which contains the fixed spark advance values and which corresponds to memory 108 shown in FIG. 4. FIG. 8 also shows a fixed air/fuel ratio schedule 160 which contains the fixed air/fuel ratio values and which corresponds to memory 114 shown in FIG. 4. FIG. 8 further shows an air/fuel ratio correction schedule 162 which contains the correction values for air/fuel ratio and corresponds to memory 120 shown in FIG. 4. FIG. 8 would also apply to the FIG. 26 embodiment although the fixed air/fuel ratio schedule 160 along with "AFR BASE" input to IGNLU, SAFIRE and DWELL and the DWELL injector drive output would be deleted. Also the AIR-FUEL RATIO CORRECTION SCHEDULE 162 would be changed to SPARK-ADVANCE CORRECTION SCHEDULE 260.

Although the FIG. 26 example describes applying perturbations to the spark advance angle in a spark ignition engine in order to obtain corrections to this parameter, the present invention is not limited to this application. For example, it could also be used to apply perturbations to the timing of fuel injection in either petrol or diesel engines so as to provide corrections for this parameter. Also, in both petrol and diesel engines, the air/fuel ratio is established in accordance with a predetermined schedule. The present invention could be used to apply perturbations to this ratio so as to obtain corrections to this parameter. In some diesel and in some petrol engines, exhaust gases are mixed with engine intake air in a predetermined ratio. The present invention could be used to apply perturbations to this ratio so as to obtain a correction for this parameter.

Operations with respect to the FIG. 4 embodiment will now be discussed. The module MISDET receives an interrupt signal TOOTH INTERRUPT (from conditioning circuit 208) and this module is executed each time a tooth is detected. A variable TOOTH is supplied to the module DWELL and represents the position of the crankshaft to within one tooth of the transducer 90. This module MISDET compares the period between each tooth and thereby detects the missing tooth. When the missing tooth is detected, this module re-establishes the relationship between the variable TOOTH and absolute position of the crankshaft. The module MISDET also calculates the fire period and supplies this as a variable FIRE PERIOD to the modules IGNLU and SAFIRE.

The module IGNLU receives a variable MAN PRESS representing manifold pressure which is indicative of the load demand. The variable MAN PRESS is derived from the output signal of transducer 106 (through signal conditioner 206) by an analog/digital converter which forms part of microcomputer 60.

Figure 10A:
FIGS. 10a and 10b illustrate the sequencing of operations of the program in FIG. 8.
Figure 10B:
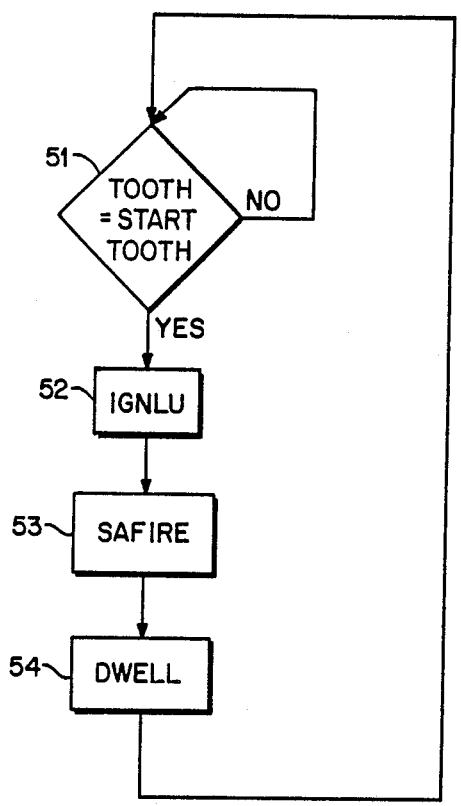

FIGS. 10a and 10b show the sequence of operations of the modules set out in FIG. 8. The program comprises a main program MAIN PROGRAM shown in FIG. 10b and an interrupt routine TOOTH INTERRUPT shown in FIG. 10a.

The interrupt routine shown in FIG. 10a is performed each time an interrupt signal is produced followed by the detection of a tooth. In this routine, the module MISDET is called.

In the main program as shown in FIG. 10b, the variable TOOTH is compared with a constant START TOOTH in a step S1. The constant START TOOTH is chosen to correspond to the correct angular position of the crankshaft to allow modules IGNLU, SAFIRE and DWELL to be executed before the occurrence of the next spark. When an equality is found in step S1, these three modules are performed successively in steps S2, S3 and S4 before returning to step S1. Thus, the modules IGNLU, SAFIRE and DWELL are executed synchronously with the firing of the engine and these modules are always executed between actual sparks.

In each of the schedules 160, 162 and 164 of FIG. 8, the spark advance and air/fuel ratio values are stored as a 16 × 16 array. In each array, the abscissa and ordinate correspond respectively to engine speed and load demand and the abscissa and ordinate are divided respectively into 16 discrete engine speed and load demand values. Thus, each array point contains the spark advance and air/fuel ratio value for one of the discrete engine speed and one of the discrete load demand values.

In order to address the schedules 160, 162 and 164, the module IGNLU generates address variables SPEED INDEX and LOAD INDEX corresponding respectively to engine speed and load demand. Each of these address variables can assume any one of values 0 to 15 corresponding to the 16 discrete engine speed and load demand values. These variables are set to the value corresponding to the engine speed and load demand immediately below the prevailing speed and load demand. The address variables SPEED INDEX and LOAD INDEX are supplied to the submodules LOOK UP, MAP STORE, and LOOK UP CORRECTION.

The module IGNLU also calculates four variables MAP INT 0 to 3 which represent the four weighting factors mentioned previously, which will now be explained further. The four variables MAP INT 0 to 3 correspond to the four addresses (SPEED INDEX, LOAD INDEX), (SPEED INDEX +1, LOAD INDEX), (SPEED INDEX, LOAD INDEX +1), (SPEED INDEX +1, LOAD INDEX +1), respectively.

Figure 9:
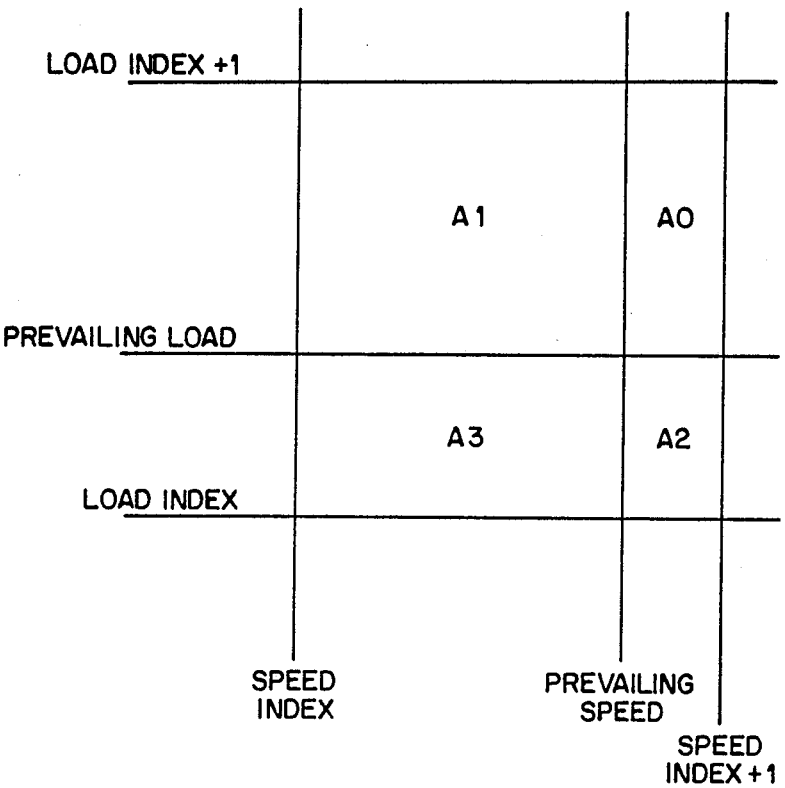
FIG. 9 is a diagram illustrating the calculation of weighting factors used in the program.

The method of calculating the weighting factors MAP INT 0 to 3 for the prevailing engine operating parameters such as speed and load is shown in FIG. 9. A main rectangle is formed in the speed/load plane, the corners of the rectangle lying at addresses (SPEED INDEX, LOAD INDEX), (SPEED INDEX +1, LOAD INDEX), (SPEED INDEX, LOAD INDEX +1), (SPEED INDEX +1, LOAD INDEX +1). This main rectangle is divided into four sub-rectangles by drawing the abscissa and ordinate passing through the detected or prevailing engine speed and load demand, these sub-rectangles having areas A0, A1, A2, A3. The weighting factor for each of the four array points is calculated by dividing the area of the sub-rectangle diagonally opposite the array point by the area of the main rectangle. Thus, the weighting factors MAP INT 0 to 3 have the following values:

MAP INT 0 = A0/A

MAP INT 1 = A1/A

MAP INT 2 = A2/A

MAP INT 3 = A3/A where A = A0 + A1 + A2 + A3. Of course, only a minimum of 3 points are needed for interpolation. These would form a main triangle around the prevailing speed and load. Sub-triangles would be formed by connecting the prevailing speed and load to each of these 3 data points. The weighting factor for each of the 3 points is calculated by dividing the area of the sub-triangle opposite the array point by the area of the main triangle. Alternatively, the weighting factor for each array point could be dependent on its distance from the prevailing engine operating parameters e.g. by calculating the weighting factor as the exponential of the negative of the distance. Using this technique it is possible to update correction values beyond those array points closest to the prevailing engine operating parameters.

The module IGNLU calls the submodule LOOK UP which calculates the baseline spark advance angle as a variable SPK ANG BASE by the interpolation process which has been described above. The module IGNLU then supplies the variable SPK ANG BASE to the module SAFIRE. The module IGNLU then calls the submodule LOOK UP again which calculates the basic air/fuel ratio by the same interpolation process. The module IGNLU then supplies the variable AFR BASE to the module SAFIRE. The module IGNLU is executed after each ignition spark and the module SAFIRE is executed after module IGNLU.

The module SAFIRE generates the perturbation wave form, determines each perturbation to the spark advance angle, determines the positive and negative measurement windows and accumulates the fire periods occurring in these windows, and calculates the slope of engine output with respect to spark advance. This module uses the slope measurement to update the air/fuel ratio correction schedule and retrieves a correction value to the air/fuel ratio from this schedule. This module also sums the baseline spark advance value SPK ANG BASE with the perturbation value to produce a spark command value SPK ANG for the spark advance angle and supplies this to the module DWELL. The SAFIRE module also sums the basic air/fuel ratio value AFR BASE with the calculated correction value to produce an air/fuel ratio command value and supplies this to the module DWELL. SAFIRE will now be described with reference to the flow chart shown in FIGS. 11-13.

In the present example, the lowest perturbation frequency is 10 Hz. As a four cylinder engine has two engine fires for each revolution of the crankshaft, and as it is necessary to produce a minimum of two perturbations for each perturbation cycle, the perturbations can only be used when the engine speed is greater than or equal to 600 RPM. Thus, after entering the module SAFIRE, in a step 200, a variable ENG SPEED representing engine speed is examined. If the engine speed is less than 600 RPM, in a step 201a AFR is set to AFR BASE and in step 201b SPK ANG is set to SPK ANG BASE. If the engine speed is equal to or greater than 600 RPM, in a step 202 a variable ELAPSED TIME is computed. This variable represents the time which has elapsed since the previous execution of this module and is approximately equal to the fire period. It is computed from the output of an internal clock in the microcomputer 60. A variable COUNTER is then incremented by ELAPSED TIME. The variable COUNTER represents the time which has elapsed since the beginning of the present perturbation cycle.

In step 203, the sum of COUNTER and ELAPSED TIME is compared with a constant PERT PERIOD. The constant PERT PERIOD represents the maximum period of each cycle of the perturbation wave form and, as the minimum frequency is 10 Hz, this constant has a value of 100 ms. If the sum is greater than PERT PERIOD, this means that it is not possible to fit a further engine fire into the present cycle. Consequently, a new cycle must commence. In order to achieve this, in a step 204, COUNTER is reset to zero. Also, a variable HALF TIME is set to PERT PERIOD and a variable DITHER is set to $+3.75°$. The variable HALF TIME usually indicates the duration of the first part of each cycle. However, for a reason which will be explained below it is set to PERT PERIOD at this stage. DITHER represents the perturbation value.

In a step 205, the condition COUNTER plus ELAPSED TIME/2 $\geq$ PERT PERIOD/2 is checked. In a step 206, the condition DITHER $= +3.75°$ is checked. The conditions of steps 205 and 206 jointly define the transition point between the first and second parts of the cycle. It is to be noted that the transition will occur approximately half way through each cycle.

If the conditions in steps 205 and 206 are satisfied, the second part of the cycle commences. In order to achieve this, in a step 207 (FIG. 12), DITHER is set to $-3.75°$ so as to provide a negative perturbation and HALF TIME is set to COUNTER. Thus, the duration of the first part of the cycle is now stored in HALF TIME.

In a step 208, a variable NUM FIRES which represents a prediction of the whole number of engine fires which can be achieved in the remaining part of the present perturbation wave form is computed. In a step 209, a variable PRED PERT PERIOD is computed and this variable represents an estimate of the period of the present cycle of the perturbation wave form.

As mentioned above, the present execution of the module SAFIRE occurs between ignition sparks. The perturbation to the spark advance angle which is calculated during the present execution of this module cannot take effect until the next ignition spark. Also, the value of the variable FIRE PERIOD which is available for the present execution of this module relates to the previous fire period. Thus the perturbation to the spark advance angle for the spark which occurred at the beginning of this fire period was calculated during the next to the last execution of this module. In using the presently available value of FIRE PERIOD to calculate the slope, it must be determined whether the central point of the fire period occurred in a positive or negative measurement window. In order to do this, this module uses three variables THIS FIRE, LAST FIRE, and FIRE BEFORE LAST. The values of these variables determine whether the fire period following the next ignition spark, the fire period following the immediately preceding ignition spark, and the fire period following the next to the last ignition spark, respectively, occurred in a positive or negative measurement window. Each of these variables can take one of four values and these are FIRST POS, REST OF POS, FIRST NEG, and REST OF NEG. These four values indicate that a fire period is the first fire period in a positive measurement window, one of the remaining fire periods in a positive measurement window, the first fire period in a negative measurement window, and one of the remaining fire periods in a negative measurement window, respectively.

During each execution of this module, the values of these four variables must be updated and, in step 210, the variables FIRE BEFORE LAST and LAST FIRE are updated by setting them respectively to the presently held values of the variables LAST FIRE and THIS FIRE.

In a step 211, a new value for the variable THIS FIRE is calculated. As may be recalled, this refers to the fire period following the next ignition spark. In order to do this, the following comparison is first made:

0.2 (PRED PERT PERIOD) $\geq$ COUNTER $+0.5$
(FIRE PERIOD) $<0.2$ (PRED PERT PERIOD)
$+$HALF TIME.

COUNTER $+0.5$ (FIRE PERIOD) defines the central point of the next fire period. In the present example, the positive and negative measurement windows follow the first and second parts of the period of each perturbation cycle by $72°$. Thus, 0.2 (PRED PERT PERIOD) and 0.2 (PRED PERT PERIOD) $+$HALF TIME define the beginning and end of the positive measurement window.

If the result of this comparison is yes, this means that the central point of the next fire period will fall in the positive measurement window. The variable LAST FIRE is examined and the variable THIS FIRE is set to FIRST POS OR REST OF POS as is appropriate. If the result of the comparison is no, this means that the central point of the next fire period will fall in a negative measurement window and THIS FIRE is set to FIRST NEG or REST OF NEG.

As mentioned above, HALF TIME is set to PERT PERIOD during the first part of each period. Without doing this, HALF TIME would be set to the duration of the first part of the previous cycle. Under rapid deceleration, there is a danger that the next engine fire could be judged incorrectly to be in a negative measurement window. By setting HALF TIME to PERT PERIOD, this danger is avoided.

Next, in a step 212 (shown in FIG. 13), the variable FIRE BEFORE LAST is examined. Depending upon the value of this variable, one of the sub-routines REST OF NEG, FIRST POS, REST OF POS, and FIRST NEG is performed and these sub-routines are shown respectively in FIGS. 14, 15, 16 and 17.

Figure 14:
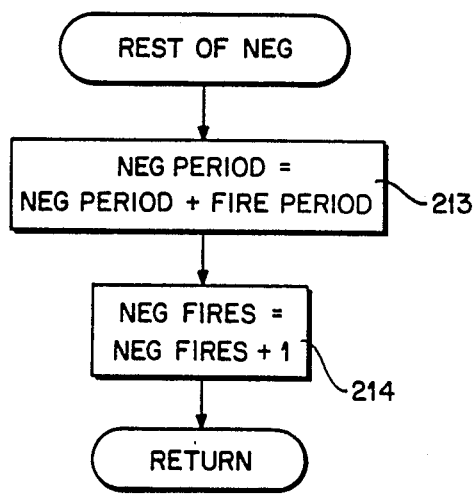
FIGS. 14–17 are detailed flowcharts of subroutines in FIG. 13.
Figure 11:
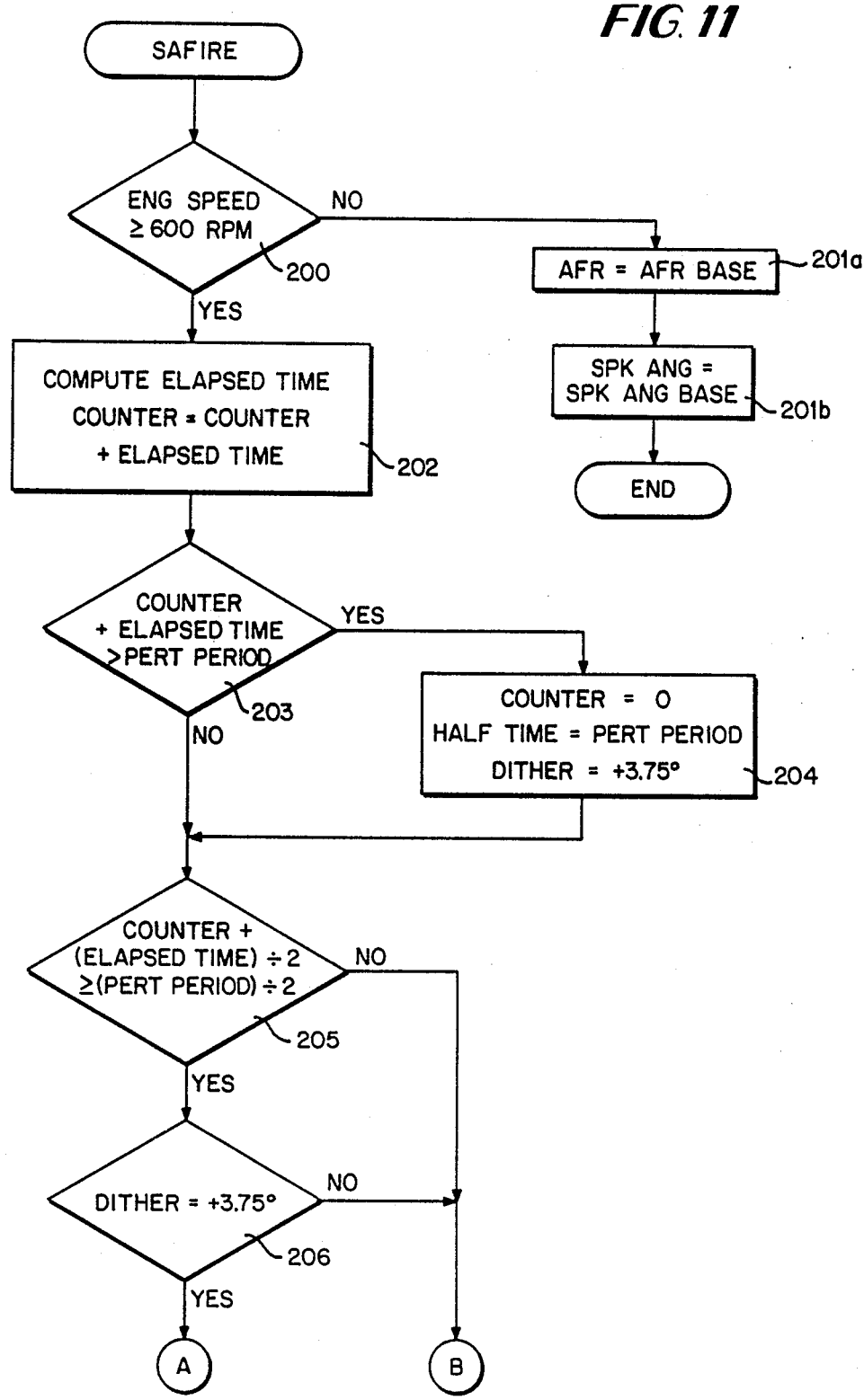
FIGS. 11 to 13 are a flowchart of the SAFIRE Routine in FIG. 8.
Figure 13:
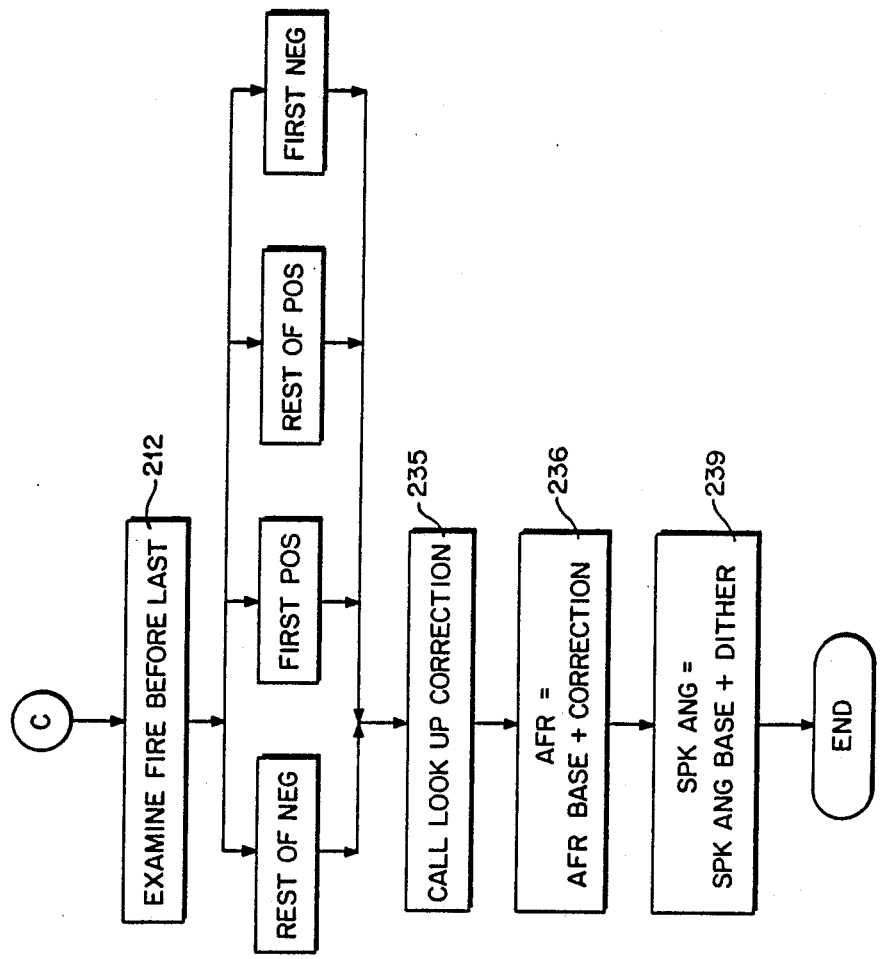
Figure 12:
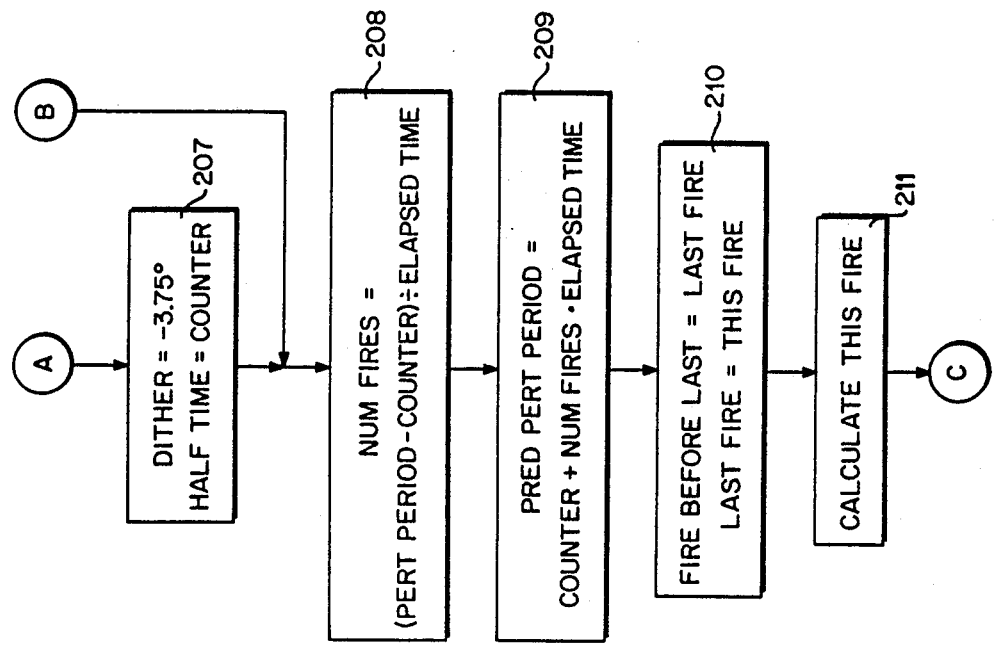

As shown in FIG. 14, if FIRE BEFORE LAST has a value REST OF NEG, in a step 213 a variable NEG PERIOD which represents the accumulated value of the fire period in the negative measurement window is incremented by the present value of FIRE PERIOD. Then, in a step 214, a variable NEG FIRES which represent the number of ignition sparks in the negative measurement window is incremented.

Figure 15:
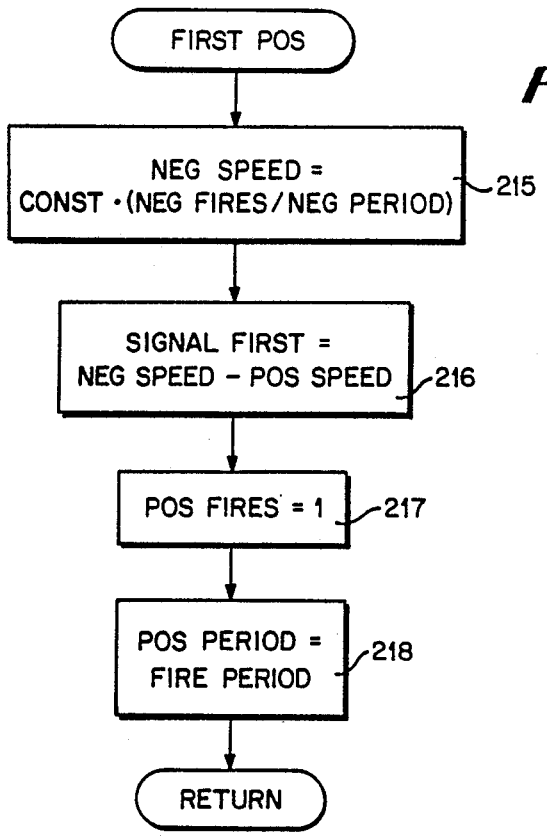

As shown in FIG. 15, when FIRE BEFORE LAST has a value FIRST POS, in a step 215, a variable NEG SPEED is calculated. This variable represents the average engine speed during the negative measurement window and it is calculated by dividing NEG FIRES by NEG PERIOD and multiplying the result by a constant CONST. Then, in a step 216, a variable SIGNAL FIRST is calculated by subtracting POS SPEED from a variable NEG SPEED. The variable POS SPEED represents the average speed in the positive measurement window and variable SIGNAL FIRST represents the change in engine speed which is caused by the change in perturbation to the spark advance angle between the first and second parts of the perturbation wave form. Then, in a step 217, a variable POS FIRES which represents the number of engine fires in the positive measurement window is set to 1. In a step 218, a variable POS PERIOD which represents the accumulated fire periods in the positive measurement window is set to the present value of FIRE PERIOD.

Figure 16:
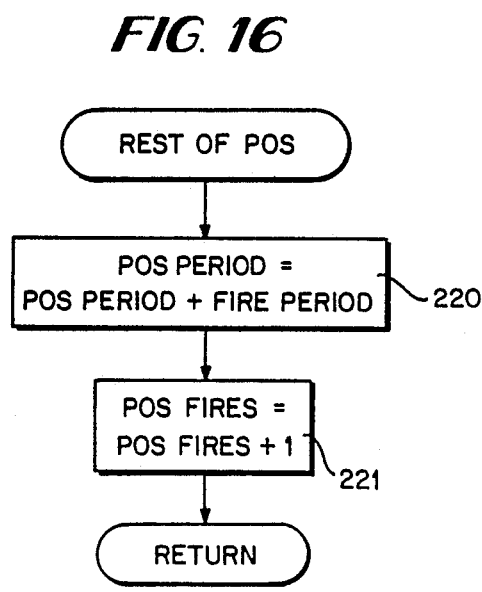

As shown in FIG. 16, when FIRE BEFORE LAST has a value REST OF POS, in a step 220, POS PERIOD is incremented by the present value of FIRE PERIOD. Then, in a step 221, POS FIRES is incremented.

Figure 17:
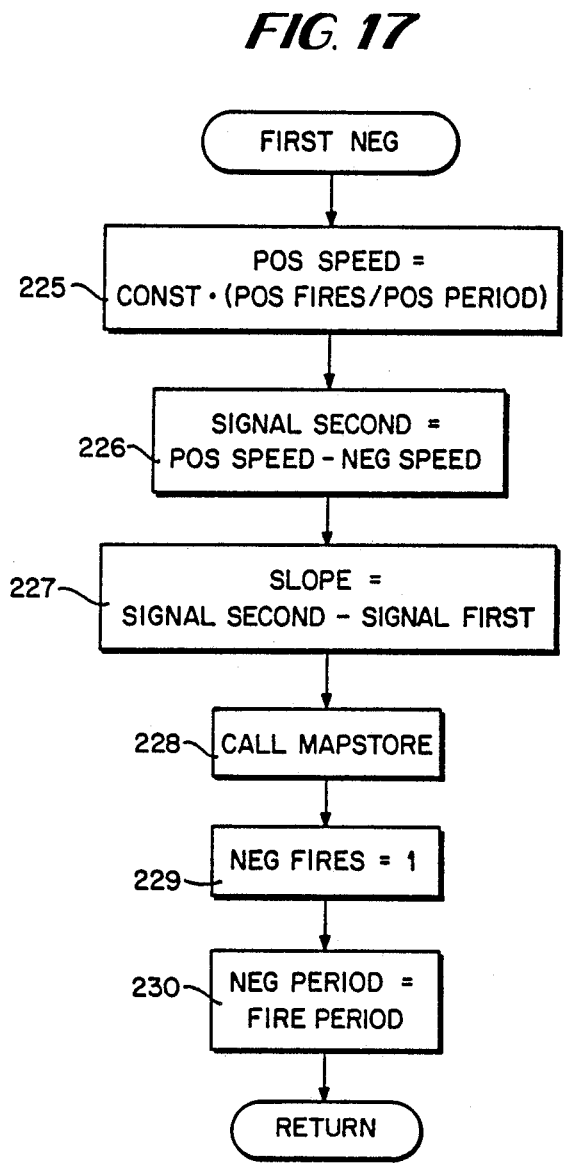

As shown in FIG. 17, when FIRE BEFORE LAST has a value FIRST NEG, in a step 225, the variable POS SPEED is evaluated by dividing POS FIRES by POS PERIOD and multiplying the result by CONST. Then, in a step 226, a variable SIGNAL SECOND is evaluated by subtracting NEG SPEED from POS SPEED. The variable SIGNAL SECOND represents the change in engine speed which is caused by the change in perturbation value from the second part of one perturbation wave form to the first part of the next perturbation wave form. In a step 227, a variable SLOPE which represents the slope of engine output with respect to spark advance is evaluated by subtracting SIGNAL FIRST from SIGNAL SECOND. By evaluating the slope in this manner, as mentioned above with reference to FIG. 4, changes in engine speed which are caused by rapid uniform acceleration or deceleration of the engine are eliminated. The magnitude of SLOPE may also be limited to a preset maximum value.

In a step 228, the submodule MAP STORE is called. This module uses the recently calculated value of SLOPE together with the values of MAP INT 0 to 3, SPEED INDEX and LOAD INDEX, which it receives from module IGNLU, to update the correction schedule 111. This is performed in a manner described with reference to FIG. 9. Next, in a step 229, the variable NEG FIRES is set to 1 and in a step 230, the variable NEG PERIOD is set to the present value of FIRE PERIOD.

Returning now to FIG. 13, after one of the subroutines has been performed, in a step 235, the submodule LOOK UP CORRECTION is called. This submodule calculates a variable CORRECTION which represents the appropriate correction to the air/fuel ratio from the values stored in the air/fuel ratio schedule. This variable is calculated by the interpolation method described with reference to FIG. 9.

Next, in step 236, the variable AFR is calculated as the sum of AFR BASE and CORRECTION. AFR represents the optimum air/fuel ratio for the prevailing engine speed and load demand.

In a step 239, the variable SPK ANG is calculated as the sum of SPK ANG BASE and a constant DITHER. Thus, either a positive or negative perturbation corresponding to 3.75° of crankshaft is imposed on the optimum spark advance angle.

Returning to FIG. 8, the module or routine DWELL uses variables TOOTH, ENG SPEED, and SPK ANG to calculate a variable COIL DRIVE which controls the generation of each spark. Specifically, COIL DRIVE causes the HIGH SPEED output of microcomputer 60 to go low when the engine crankshaft passes the commanded spark advance position and to go high early enough to allow the primary current in the ignition coil to reach the required value.

DWELL also uses variables TOOTH, AFR, ENG SPEED and MAN PRESS to calculate the injector on time. The variable INJECTOR DRIVE causes the HIGH SPEED output of the microcomputer 100 to go high for the correct time to ensure that the correct amount of fuel is injected into the engine 10. Although the above routine calculations average speed in each measurement window by accumulating engine fire periods, speed could be calculated in a different manner, e.g., a peak measurement from a speed detector.

In the program module SAFIRE which has been described with reference to FIGS. 10 through 17, step 215 of the sub-routine FIRST POS and step 225 of sub-routine FIRST NEG involves division which requires a substantial amount of computing time. There will now be described with reference to FIGS. 18 and 19 a modification to these two sub-routines which avoids the necessity for division by the computer.

The small changes in engine speed which occur between the positive and negative measurement windows are proportional to minus the change in the average engine fire period during the two windows. Thus, an indication of the change of speed could be obtained by calculating the change in the average fire period. However, the constant of proportionality increases with the square of the engine speed and so the sensitivity using this method would fall rapidly with increasing engine speed. Consequently, at high engine speeds, the correction schedule would be updated too slowly while there could be instability at low engine speeds.

This variation in sensitivity may be avoided by multiplying the change in average fire period by the square of the engine speed. The square of the engine speed is approximately proportional to the product of the number of fires occurring in the first half period and the numbers of fires occurring in the second half period of each cycle of the perturbation wave form. Thus, the change in engine speed between a positive measurement window and a negative measurement window may be expressed as follows:

$$\text{Change in speed} = k \cdot n^- n^+ (T^+/n^+ - T^-/n^-)$$

where $k$ is a constant, $n^+$ and $n^-$ are the number of engine fires occurring respectively in the positive and negative measurement windows, and $T^+$ and $T^-$ are the accumulated fire periods for these windows so that the $T^+/n^+$ and $T^-/n^-$ terms are respective average fire periods.

Figure 18:
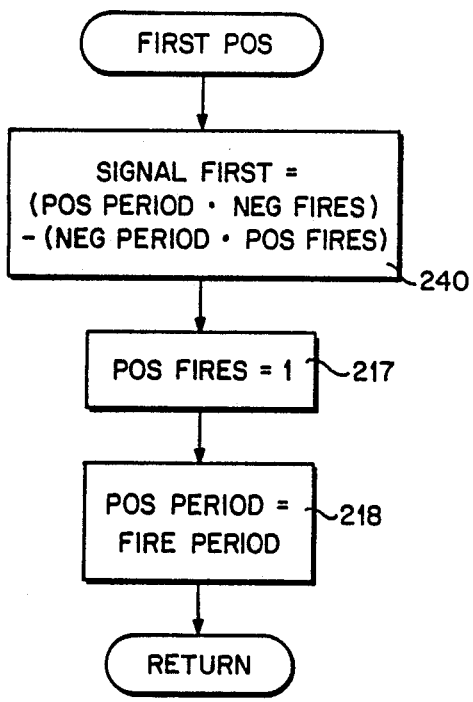
FIGS. 18 and 19 show modifications to the flow chart in FIGS. 15 and 17, respectively.
Figure 19:
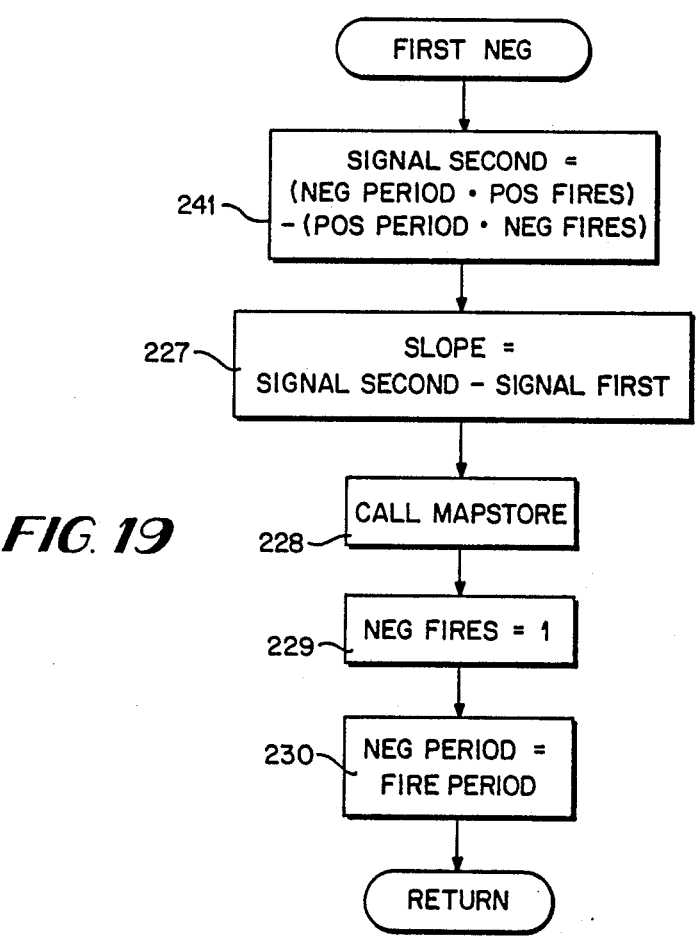

This expression simplified by cancellation of the denominator terms, together with a similar expression for the transition from a negative measurement window to a positive measurement window, is used in the modification shown in FIGS. 18 and 19. In these Figures, like steps are denoted by the same reference numerals.

Referring now to FIG. 18, in the sub-routine FIRST POS, the steps 215 and 216 of FIG. 15 are replaced by a new step 240. In the step 240, the variable SIGNAL FIRST is calculated as the difference between the product of variables POS PERIOD and NEG FIRES and the product of the variables NEG PERIOD and the POS FIRES. In FIG. 19, the steps 225 and 226 of FIG. 17 are replaced by a new step 241. In step 241, the variable SIGNAL SECOND is calculated as a difference between the product of NEG PERIOD and POS FIRES and the product of POS PERIOD and NEG FIRES. As may be seen, steps 240 and steps 241 do not involve division and less computational time is required.

It should be noted that the embodiment described above differs fundamentally from the system described in the aforementioned SAE publication. In that case, the ignition timing is perturbed about a value of ignition timing which is adjusted in accordance with the response to the perturbations. The engine in question employs a fuel control which is completely independent of the ignition timing optimizer. With such an arrangement, if the fueling gives rise to an error in air/fuel ratio, this will affect the operation of the ignition timing optimizer. Thus, if the fueling is wrong, but the ignition timing is right, the optimizer will change the ignition timing but leave the fueling unaltered. This will maximize torque, but could seriously worsen the NOx emission performance. With the above embodiment of the present invention, on the other hand, the ignition timing is set to a value which will give maximum torque with respect to small changes in the spark timing only when the desired air/fuel ratio for the required level of NOx emission is actually obtained.

In a multicylinder engine individual cylinders may have faster burning characteristics than others due, for instance, to thermal effects from neighboring cylinders. Also, it is well-known that air/fuel ratio may vary from cylinder to cylinder due to distribution problems. The present invention includes control of the mixture composition of individual cylinders or groups of cylinders, and consequently the NOx emissions of those faster and slower burning cylinders can be brought closer to the required value. This requires independent control of the fuel dispensed to each individual cylinder, or to groups of cylinders forming part of the engine.

The embodiment of the present invention covering control of the mixture composition of individual cylinders or groups of cylinders can compensate for air maldistribution o fuel mal-distribution caused for instance, by production tolerances or aging in the fuel control devices. This will now be explained further for the case of individual cylinder control, but the description also covers groups of cylinders sharing a common fuel control, e.g. one manifold feeding 2 cylinders.

Figure 20:
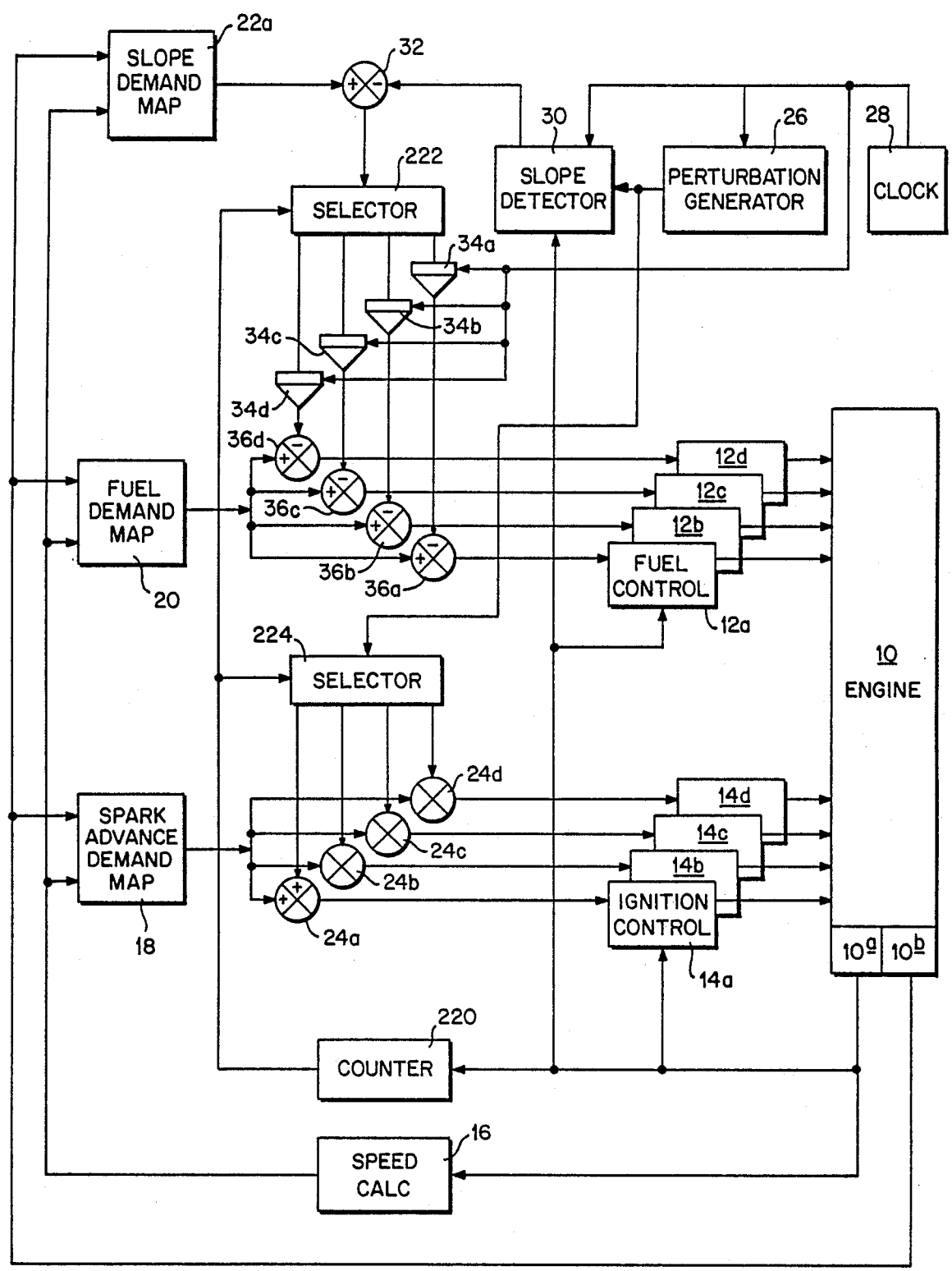
FIGS. 20 to 23 are block diagrams of four more embodiments of the invention.

FIG. 20 shows a system that is similar in principle to that shown in FIG. 2 but in which the fueling is optimized for each individual cylinder of a four cylinder engine. The engine 10 and transducers 10a and 10b are as described for FIG. 2. The ignition control 14 of FIG. 2 has now been divided into separate ignition controls 14a, 14b, 14c, 14d for each individual cylinder it being appreciated that a common coil and distributor could be utilized t give distinct spark timings in this case. The fuel control 12 of FIG. 2 has been divided into separate fuel controls 12a, 12b, 12c, 12d, it being appreciated that a common injector could be used to dispense distinct amounts of fuel to each cylinder in this case. The maps 18 and 20 of FIG. 20 are exactly the same as described for FIG. 2. As will be seen, map 22a is related to but not exactly the same as map 22.

FIG. 20 contains a counter 220 which determines which of four cylinders is to have its fueling optimized. Each cylinder will be optimized for a fixed duration defined as a number of engine fires. Counter 220 will select a different cylinder for optimization after this duration expires.

Counter 220 controls which cylinder is to be optimized via two selectors 222 and 224. Selector 224 determines which of four summers 24a, 24b, 24c, 24d receives the perturbation signal at a given time and only the selected cylinder to be optimized has its spark angle perturbed. Selector 222 determines which of four integral controllers, 34a, 34b, 34c, 34d will be updated by slope error information. These correspond to controller 34 described for FIG. 2. The counter 220 ensures that the cylinder whose fueling is updated is the same as that whose ignition spark angle is perturbed.

Having selected a cylinder for optimization, then the operation of FIG. 20 is similar to that of FIG. 2. The ignition timing angle signal from map 18 is supplied to the ignition controls 14a to 14d via summers 24a to 24d. The perturbation signal from the perturbation generator 26 will be directed via selector 224 to the summer corresponding to the cylinder to be optimized.

The perturbation signal, together with the signals from transducer 10a and the clock 28, will be supplied to the slope detector 30. This operates to monitor the effect of the perturbation in ignition angle on engine speed. It produces an output signal proportional to the slope $\partial n/\partial T$ for the cylinder being optimized. This signal is supplied to an error detecting summer 32 which compares the actual value of $\partial n/\partial T$ with the demanded value derived from map 22a. The resulting error signal is then directed via selector 222 to the integral controller of the cylinder being optimized. The outputs of the four integral controls 34a to 34d are applied to four summers 36a to 36d which subtract the output of the integral control from the fuel demand signal derived from map 20. The resulting "corrected" fuel demand signals, one for each cylinder, are applied to the corresponding fuel controls 12a to 12d.

The slope detector signal magnitude for an individual cylinder ignition perturbation will be smaller than the corresponding signal magnitude for the multicylinder ignition perturbation described for FIG. 2. The noise component for the individual cylinder method will, however, still be comparable with the noise component for the multicylinder method. Thus, the integral controls 34a to 34d of FIG. 20 will have nominally the same gain as the integral control 34 of FIG. 2. This results in longer optimization time constant for individual cylinder fuel optimization.

In general, for a given small change in ignition angle, then the slope $\partial n/\partial T$ for an individual cylinder will differ from that for the entire engine. Consequently, the contents of map 22a of FIG. 20 should be only one quarter of the magnitude of the contents of map 22 of FIG. 2.

The arrangement of FIG. 20 is only applicable to engines in which fueling to each cylinder can be controlled separately, for example, by fuel injection into the air intake manifold branch associated with each cylinder or to engines in which fueling to groups of cylinders can be controlled separately, e.g. employing two carburetors, each with its own manifold to separate groups of cylinders.

Figure 21:
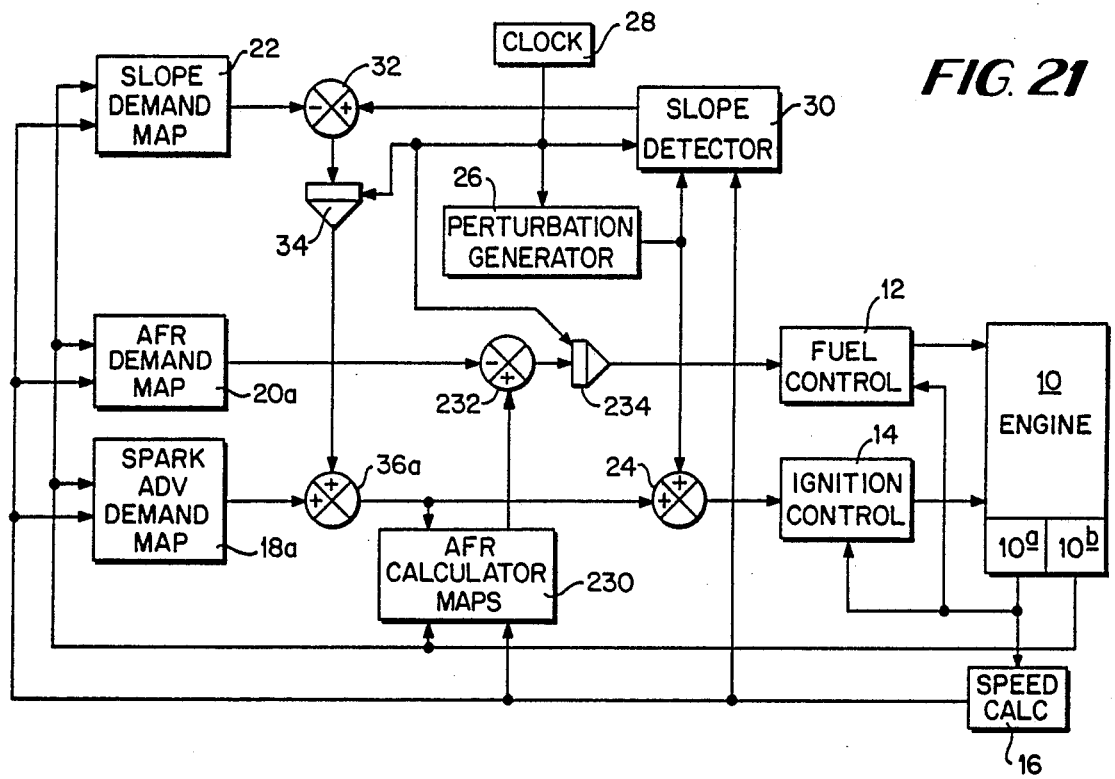
Figure 22:
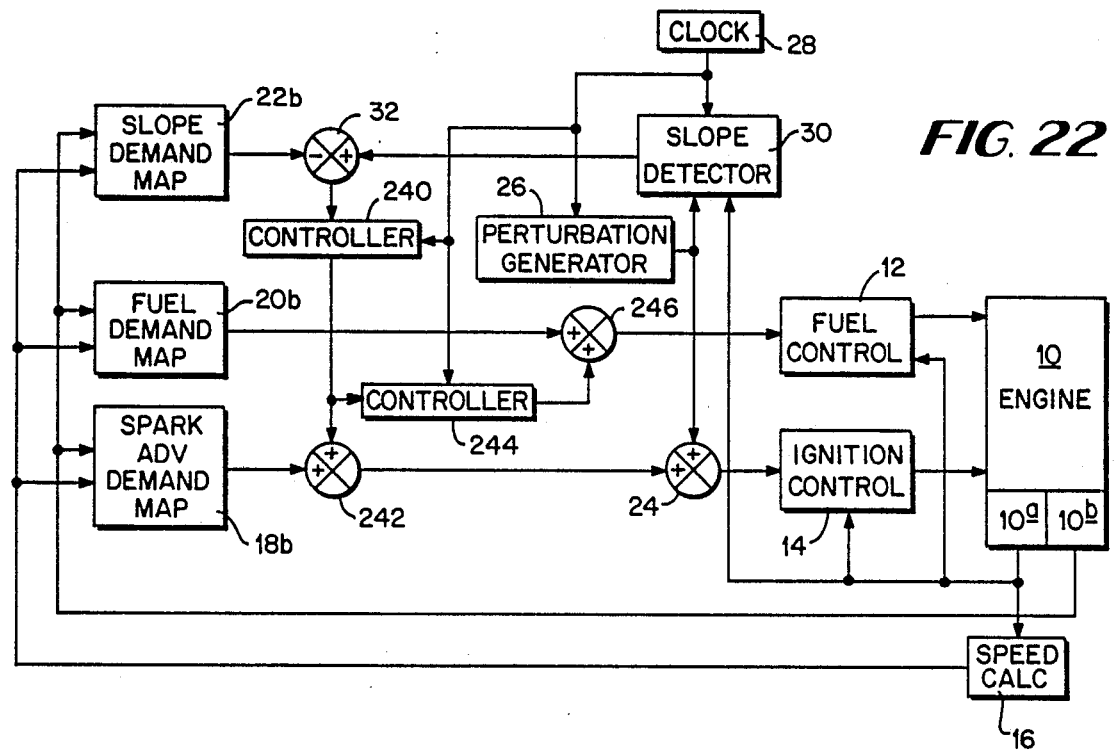

FIGS. 21 and 22 show systems which initially operate in a similar way to the prior art mentioned above, by adjusting the spark timing so as to bring the measured slope close to the desired slope. They differ from the prior art in that the fueling is then controlled in response to the changed spark timing, so that eventually changes in the fueling substitute for changes in the spark timing. Such a system may be advantageous by giving some of the benefit of the prior art system in the manner of short-term response in addition to the benefits of the system of FIG. 2 in the longer term to an engine and fueling system which may not be susceptible to rapid correction of the fueling.

Turning now to FIG. 21, parts which are substantially the same as those shown in FIG. 2 have the same reference numerals. The map 18 in FIG. 2 is replaced by a map 18A giving an output approximately representing desired ignition timing angle. This is not connected directly to the summer 24 but to a summer 36A which also receives the output of controller 34. Instead of fuel demand map 20, there is an air/fuel ratio demand map 20A which contains values of the air/fuel ratio required at different combinations of engine speed and load demand to achieve the required NOx emission performance. Summer 32 supplies controller 34 with a signal representing the slope error.

Controller 34 (which may have an integral characteristic, or a proportional plus integral characteristic for greater stability) acts to reduce the slope error by generating a correction directly to the spark advance. This correction is added to the approximate desired spark advance output from map 18A in summer 36A to provide an intermediate spark advance which is then supplied via summer 24 to the ignition control 14. With this arrangement, the ignition timing angle is optimized substantially as in the embodiment described above with reference to FIG. 26.

The current estimate of the optimum spark advance is also supplied from summer 36A to another map 230. Map 230 is used for obtaining an estimate of the actual existing air/fuel ratio. In this case, the digital memory has its address word defined by combining speed, throttle angle (indicative of load demand) and the intermediate spark advance, the latter being the output of summer 36A. The words, stored at the various addresses in this memory, represent curves such as e from FIG. 1. The demanded AFR provided by map 20A is subtracted in summer 232 from the estimate of actual AFR provided by map 230 so as to form an AFR error signal. The AFR error signal which represents the excess in the AFR is then integrated by a controller 234 to provide the fuel demand signal to fuel control 12. With this arrangement, the spark advance is maintained close to its optimum level all the time since the ignition controller 34 can be given a relatively rapid response. The fueling loop under the action of controller 234 will react more slowly since it cannot correct the air/fuel ratio until a correct estimate of the optimum spark advance has been formed. Once again, excellent control of NOx emissions is possible along with fuel efficient running of the engine.

FIG. 22 shows a example of the invention in which the output of the slope error detecting summer 32 is applied to a controller 240 (which may have an integral transfer characteristic or a proportional plus integral one for greater stability) the output of which is applied to another summer 242. This summer 242 adds the controller 240 output to the output from spark advance demand map 18B providing an intermediate spark angle so as to correct the ignition timing to the required value for the existing fueling conditions (as in the embodiment described above with reference to FIG. 26). The output of the controller 240 is also applied, however, to another controller 244, the output of which is added to the output of the fuel demand map 20B by a summer 246. The controller 244 (which may have an integral transfer characteristic) acts on the fueling so as to reduce the spark adjustment signal fed to it, from controller 240. With such an arrangement, the spark advance is maintained at its optimum level substantially all the time, since the ignition control loop can be given a relatively rapid response. The fueling control loop under the influence of controller 244, however, operates relatively slowly, but has the effect of slowly replacing correction of ignition timing by correction of AFR. In steady running, the correction applied to the ignition timing will be reduced to zero. Thus, in steady running, the system of FIG. 22 is equivalent to that shown in FIG. 2, but the response of the two systems to changes differs significantly.

It is instructive to consider the trajectory followed on the diagram of FIG. 1 by the systems of FIG. 2, FIG. 21 and FIG. 22, starting from point X. It may be desired to operate at point Y but, owing to an error in the fueling, the engine is operating at point X. In the prior art systems, as the engine torque is not maximum at point X, the ignition timing will be adjusted vertically (straight dashed line) until the engine operates at point Z on line e. Thus, the engine will operate with an air/fuel ratio substantially richer than desired. Although the torque is maximized, the error in the fueling may seriously worsen the generation of oxides of nitrogen.

The present invention as shown in FIG. 2 uses the error in the slope of engine output with respect to spark advance to correct the fuel composition directly without any change in the basic spark advance. The operation point will therefore move horizontally (straight dashed line) to the right on FIG. 1 until point Y on line e, is reached.

The systems of FIG. 21 and FIG. 22 both use the slope information in the first place to correct the spark advance and therefore make their first moves vertically down on FIG. 1 towards line e, just as would the prior art system mentioned above. However, before line e is reached, the fuel composition control loop would begin to react so the trajectory on FIG. 1 would curve to the right and slope upwards somewhat (curved dotted line), becoming asymptotic to line e and moving up and to the right until finally settling point Y on line e, just as in the system of FIG. 2 with the composition adjusted as as to give the required slope with respect to spark advance.

Contrast this with the prior art invention which does not alter the composition and settles at a point on line e vertically displaced from point X which may not provide desired control of NOx.

Figure 23:
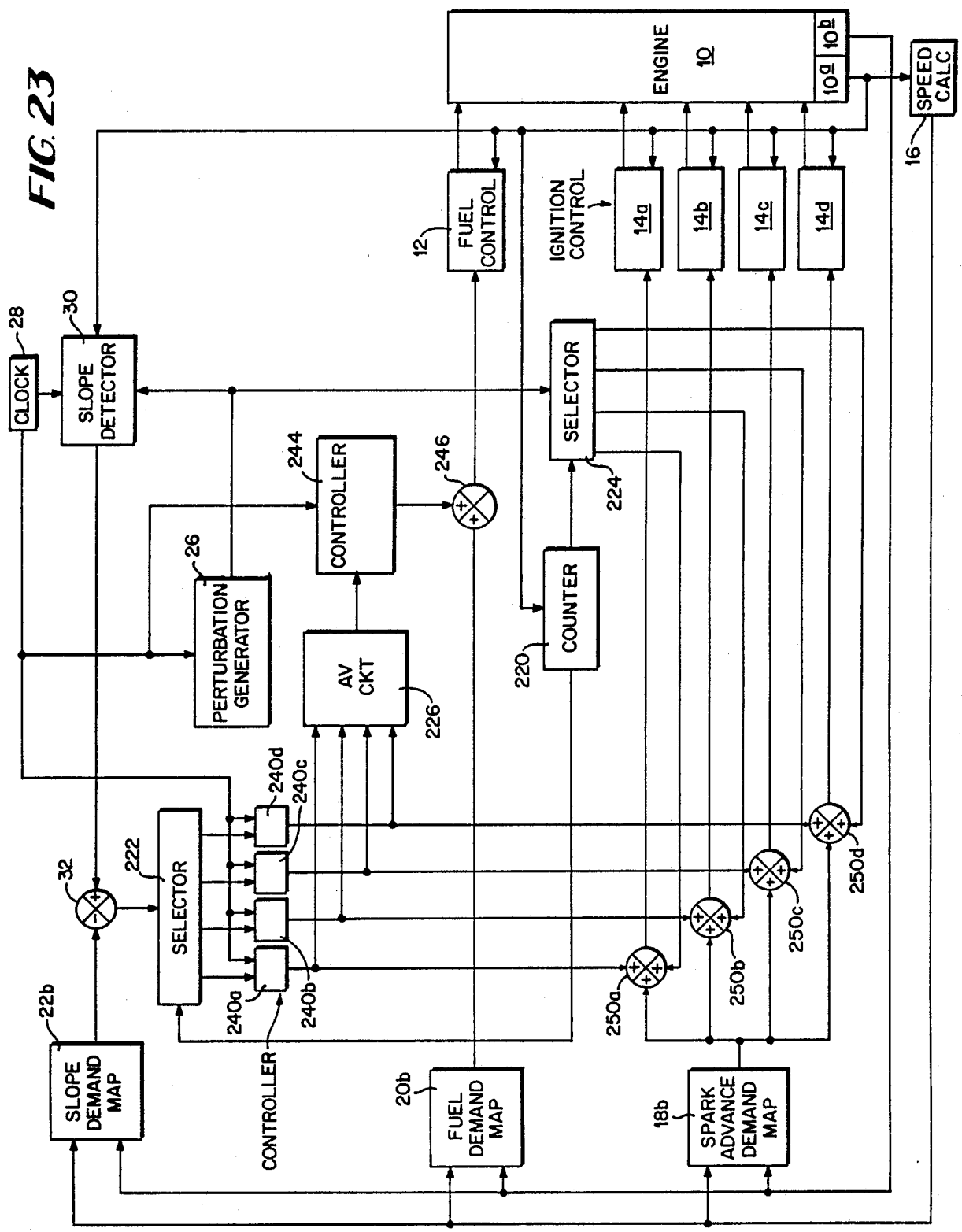

FIG. 23 shows the application of the principle of FIG. 22 to an engine in which ignition timing for each cylinder is controlled separately, but in which mixture composition is controlled jointly (for example, by a carburetor or by exhaust gas recirculation). In the example shown, the functions of the summers 242 and 24 in FIG. 22 have been combined, each ignition channel including a summer 250a, 250b, 250c, 250d. The perturbation signals are applied to these summers by a channel selector 224 controlled by a cycle counter 220. The counter 220 also controls a selector 222 which routes the error signals from summer 32 to a controller 240a, 240b, 240c, 240d for each channel. An averaging circuit 226 receives the outputs of all the controllers 240a to 240d and provides an output to controller 244 representing the average of the outputs of controllers 240a to 240d. Thus, in steady running, the average correction to the spark advance will reduce to zero as a result of the action of the fuel correction loop.

Instead of using an averaging circuit 226, the most positive (advanced) or most negative (retarded) correcting signal from the controller 240a to 240d may be selected for application to the controller 228.

It will be appreciated that although the invention has been described for use with conventional fueling arrangements where the mixture control means alters the rate of fuel flow, and the air flow rate or mixture flow rate is controlled by the driver of the vehicle in which the engine is installed, it is also applicable to unconventional systems in which the mixture control alters the rate of air flow, and the fuel flow is directly controlled by the driver. In this instance, maps equivalent to those of FIG. 1 may be derived but with fuel flow rate held constant rather than air flow rate. Spark advance demand angles would then be chosen for storage in spark advance demand map 18, and an air demand map would replace fuel demand map 20 in FIG. 2 and FIG. 20. In each instance, the fuel controls 12, (or 12a, 12b, 12c, 12d in separately controlled cylinders or cylinder groups) are replaced by air control means such as a servo-driven throttle butterfly. To produce the correct polarity of control action at the air control means, the output of controller 34 (FIG. 2) and controllers 34a through 34d (FIG. 20) respectively must now be added to the output from the air demand map at summer 36 (FIG. 2) and summers 36a through 36d (FIG. 20) respectively. For the example of FIG. 21, besides the spark demand map 18A being replaced as described above, the polarities of action at summer 232 must be reversed so that the signal fed to the air control via controller 234 represents the deficiency in air-fuel ratio. Similarly, FIGS. 22 and 23 the data in maps 18B and 20B would be replaced as above-described and the output of controller 244 is subtracted from the output of the air demand map.

As disclosed earlier the input parameter could be other than spark advance angle eg air/fuel mixture and the adaptive control need not involve perturbing the input. The output parameter could be the exhaust gases as monitored by eg an oxygen sensor. To apply the invention to such an arrangement, the components 26, 112, 168, 170, 172 and 174 of FIG. 26 would be removed and the blocks, 108, 110, 260, 262 and 176 would all reference air fuel ratio. The signal from the oxygen sensor is fed to the - of an additional summer with an output to correction memory updating, as block 176 of FIG. 26, while the fixed air/fuel ratio memory output, equivalent to block 108 of FIG. 26, is fed to the +of said additional summer. Finally blocks 92, 94 and 96 would be replaced by fuel control stages and block 166 removed.

The value of air fuel ratio measured by the exhaust gas sensor is compared with the predetermined air fuel ratio as determined by block 110 from block 108. This comparison is formed by the additional summer. The error is fed to correction memory updating means 176 which operates in the manner previously described in the body of the document.

Thus, in view of the above teachings, many modifications and implementations of the present invention will become obvious to those of ordinary skill in the art. The invention can be digital or analog apparatus controlling individual cylinders, groups of cylinders or the engine as a whole. The maps and controllers can be tailored as desired to meet emission (NOx, hydrocarbons, etc.), drivability, economy and performance requirements or combinations of these. Therefore, the invention is not limited to examples, embodiments and applications expressed herein, and is limited only in accordance with the claims appended hereto.

What is claimed is:

1. A system for determining an internal combustion engine input control parameter, said system comprising:
    means for determining a first engine operating parameter;
    means for determining a second engine operating parameter;
    means for determining a basic value for an engine input control parameter in accordance with a fixed map;
    a correction map means for storing correction values for said input control parameter as a two-dimensional array as a function of said two engine operating parameters
    means for providing a calculated correction value for said two prevailing engine operating parameters, said providing means includes means for multiplying each of n correction values stored in said correction map means at n array points in said two-dimensional array which surround the prevailing engine operating parameters, by respective weighting factors to provide n product values and then summing said n product values to produce a calculated correction value;
    means for determining a command value for said input control parameter by summing said basic value and a calculated correction value; and
    means for updating said values stored in said correction map means, said updating means comprising means for producing a series of error values, multiplying each error value by a respective weighting factor for each of n array points surrounding the prevailing engine operating parameters to form n product values, and using said n product values to update said correction values stored at said n array points, said weighting factors being related to the distance of the prevailing engine operating parameters from the n array points respectively, and calculating said weighting factor for each array point in relation to its distance from the prevailing engine operating parameters, wherein n is an integer greater than 2.

2. The system as claimed in claim 1, wherein n equals four and said weighting factors are determined by forming a main rectangle whose corners lie on said four array points surrounding the prevailing engine operating parameters, dividing said main rectangle into four sub-rectangles by an ordinate and abscissa which pass through said prevailing engine operating parameters, and calculating said weighting factor for each array point in dependence upon the area of the diagonally opposite sub-rectantangle by dividing the area of said diagonally opposite sub-rectangle by the area of said main rectangle.

3. The system as claimed in claim 1, wherein n equals 3 and said weighting factors are determined by forming a main triangle whose corners lie on said three array points surrounding the prevailing engine operating parameters, dividing said main triangle into three sub-triangles by connecting each of said three array points to said prevailing engine operating parameters by a line segment, and calculating said weighting factor for each array point in dependence upon the area of the diagonally opposite sub-triangle by dividing the area of said diagonally opposite sub-triangle by the area of said main triangle.

4. The system as claimed in claim 1, wherein the respective weighting factor for each array point is calculated as the exponential of the negative of its distance from the prevailing engine operating parameters.

5. The system as claimed in one of claims 1, 2, 3 or 4, wherein said updating means further includes means for multiplying each of said product values by a constant and adding the resulting values to the respective correction values presently stored at the respective array points.

6. The system as claimed in one of claims 1, 2, 3 or 4, wherein said first engine operating parameter is engine speed, said second engine operating parameter is load demand and fixed values of said engine input control parameter are stored in said fixed map as a function of engine speed and load demand, and each basic value of said engine input control parameter is determined for the value stored at said array points in the two-dimensional array which surround the prevailing speed and load demand, said input control parameter at each point is multiplied by a respective weighting factor to form a product value and the product values are summed to produce the basic value.

7. A system for the determination of slope of variations in engine output with respect to variations in an input control parameter for an internal combustion engine, said engine operating through a drive train, said engine and drive train comprising a resonant system having at least one resonant frequency, said apparatus comprising:
   means for determining a basic value for a first engine input control parameter;
   a position transducer for detecting the rotational position of said engine at least once during each engine fire period;
   a perturbation generator for perturbing said input control parameter about said basic value, said perturbation generator generating a periodic perturbation waveform and applying a positive perturbation to said input control parameter during the first part of each period of the perturbation waveform and a negative perturbation to said input control parameter during the second part of each period of the perturbation waveform, each period of said waveform being equal to a whole number of engine fire periods and the frequency of said waveform being greater than three-quarters of the highest resonant frequency of the resonant system;
   means for creating at least one series of contiguous positive and negative measurement windows associated respectively with first and second parts of said perturbation waveform, each measurement window lagging its respective part of the perturbation waveform by a predetermined phase shift; and
   means for calculating the slope of engine output with respect to said input control parameter, said calculating means calculating said slope based upon the change in engine speed between adjacent measurement windows.

8. An adaptive control system for an internal combustion engine, said engine connected through a drive train to a load forming a resonant system having at least one resonant frequency, said control system comprising:
   means for determining a basic value for an engine input control parameter;
   a position transducer for detecting the rotational position of said engine at least once during each engine fire period;
   a perturbation generator for perturbing said input control parameter about said basic value, said perturbation generator generating a periodic perturbation waveform and applying a positive perturbation to said input control parameter during the first part of each period of the perturbation waveform and a negative perturbation to said input control parameter during the second part of each period of the perturbation waveform, each period of said waveform being equal to a whole number of engine fire periods and the frequency of said waveform being greater than three-quarters of the highest resonant frequency of said resonant system;
   means for creating at least one series of contiguous positive and negative measurement windows associated respectively with first and second parts of said perturbation waveform, each measurement window lagging its respective part of the perturbation waveform by a predetermined phase shift;
   means for calculating the slope of engine output with respect to said input control parameter, said calculating means calculating said slope from the change in engine speed between adjacent measurement windows; and
   means for controlling at least one engine input control parameter to obtain a desired value of said slope.

9. A system for controlling a power producing engine, said engine having at least one input which effects an engine output, said system comprising:
   means for determining a first engine operating parameter;
   means for determining a second engine operating parameter;
   means for determining a baseline value for said engine input control parameter in accordance with a fixed map;
   correction map means for storing correction values for said input control parameter as a two-dimensional array as a function of said two engine operating parameters;
   means for providing a calculated correction value for said two prevailing engine operating parameters, said providing means including means for multiplying each of four correction values stored in said correction map means at four array points in said two-dimensional array which surrounds the prevailing engine operating parameters, by respective weighting factors to provide four product values and then summing said four product values to produce a calculated correction value;
   means for determining a command value for said particular input control parameter by summing said baseline value and said calculated correction value;
   means for updating said values stored in said correction map means, said updating means comprising means for producing a series of error values, multiplying each error value by a respective weighting factor for each of said four array points to form four product values, and using said four product values to update said correction values stored at said four array points, said weighting factors being determined by forming a main rectangle whose corners lie on said four array points surrounding the prevailing engine operating parameters, dividing said main rectangle into four sub-rectangles by an ordinate and abscissa which pass through said prevailing engine operating parameters, and calculating said weighting factor for each array point in dependence upon the area of the diagonally opposite sub-rectangle;

means for periodically perturbing said engine input control parameter about said command value;

means for monitoring said engine output;

means for determining the slope of engine output with respect to said engine input; and means for adjusting said engine input control parameter so as to obtain a desired value of said slope.

10. The system as claimed in claim 9, wherein said weighting factor for each array point is calculated by dividing the area of a diagonally opposite sub-rectangle by the area of said main rectangle.

11. The system as claimed in claim 10, wherein said first engine operating parameter is engine speed and said second engine operating parameter is engine load demand and said input control parameter is engine spark advance.

12. A system for controlling a power producing rotating engine having fire periods, said engine operating through a drive train and having an output, said engine and drive train comprising a resonant system having at least one resonant frequency, said system comprising:

means for determining a baseline value for at least one engine input control parameter in accordance with a fixed map;

a position transducer for detecting the rotational position of said engine at least once during each engine fire period;

a perturbation generator for perturbing said input control parameter about said baseline value, said perturbation generator generating a periodic perturbation waveform and applying a positive perturbation to said input control parameter during the first part of each period of the perturbation waveform and a negative perturbation to said input control parameter during the second part of each period of the perturbation waveform, each period of said waveform being equal to a whole number of engine fire periods and the frequency of said waveform being greater than three-quarters of the highest resonant frequency of the resonant system;

means for creating at least one series of contiguous positive and negative measurement windows associated respectively with first and second parts of said perturbation waveform, each measurement window lagging its respective part of the perturbation waveform by a predetermined phase shift;

means for monitoring said engine output;

means for calculating the slope of engine output with respect to said input control parameter, said calculating means calculating said slope based upon the change in engine speed between adjacent measurement windows; and means for controlling an input control parameter so as to obtain a desired value of said slope.

13. The system for controlling a power producing engine according to claim 12, wherein said system further includes:

means for determining a first engine operating parameter;

means for determining a second engine operating parameter; and wherein said baseline value determining means further includes;

correction map means for storing correction values for said input control parameter as a two-dimensional array as a function of said two engine operating parameters;

means for providing a calculated correction value for said two prevailing engine operating parameters, said providing means including means for multiplying each of four correction values stored in said correction map means at four array points in said two-dimensional array which surrounds the prevailing engine operating parameters, by respective weighting factors to provide four product values and then summing said four product values to produce a calculated correction value;

means for determining a command value for said at least one input control parameter by summing said baseline value and said calculated correction value;

means for updating said values stored in said correction map means, said updating means comprising means for producing a series of error values, multiplying each error value by a respective weighting factor for each of said four array points to form four product values, and using said four product values to update said correction values stored in said four array points, said weighting factors being determined by forming a main rectangle whose corners lie on said four array points surrounding the prevailing engine operating parameters, dividing said main rectangle into four sub-rectangles by an ordinate and abscissa which pass through said prevailing engine operating parameters, and calculating said weighting factor for each array point independence upon the area of the diagonally opposite sub-rectangle; and means for controlling said engine with said command value of said at least one input control parameter.

14. An system as claimed in claim 8 or 13, further including:

a first accumulator means for accumulating, for each positive measurement window, the individual fire periods whose central points fall within said positive window to produce a total fire period for said positive window; and a second accumulator means for accumulating, for each negative measurement window, the individual fire periods whose central points fall within said negative window to produce a total fire period for said negative window, wherein said calculating means is responsive to said total fire periods accumulated in said first and second accumulator means.

15. An system as claimed in claim 14, wherein said calculating means includes means for calculating the average engine speed during each positive measurement window by dividing the number of engine fires occurring during said positive window by the total fire period accumulated in said first accumulator and for calculating the average engine speed during each negative measurement window by dividing the number of engine fires occurring during said negative window by the total fire period accumulated in said second accumulator, and for calculating each slope value by subtracting the average engine speed occurring in a positive window from the average engine speed occurring in a subsequent negative window to obtain a first transition value, subtracting the average engine speed occurring in a negative window from the average engine speed occurring in a subsequent positive window to obtain a second transition value, and subtracting said first transition value from said second transition value to obtain said slope value.

16. An system as claimed in claim 14, wherein said slope calculating means includes means for calculating each slope value by subtracting the product of the number of engine fires occurring in one positive window and the total fire period occurring in a subsequent negative window from the product of the total number of engine fires occurring in said subsequent negative window and the total fire period occurring in said one positive window to produce a first difference value, subtracting the product of the number of engine fires occurring in one negative window and the total fire period for a subsequent positive window from the product of the total number of engine fires occurring in said subsequent positive window and the total fire period occurring in said one negative window to produce a second difference value, and subtracting said first difference value from said second difference value to produce said slope value.

17. An system as claimed in claim 16, wherein said controlling means includes means for comparing each slope value with a reference value to determine a difference value, integrates said difference values to obtain an average value, and using said average value, corrects at least one engine input control parameter.

18. An system as claimed in one of claims 8, 12 or 13, wherein said perturbed input control parameter is the same parameter as the controlled said at least one engine input control parameter.

19. A method of determining an internal combustion engine input control parameter, said method comprising the steps of:
 determining a first engine operating parameter;
 determining a second engine operating parameter;
 determining a basic value of said engine input control parameter in accordance with a fixed map;
 storing correction values for said input control parameter as a two-dimensional array as a function of said two engine operating parameters;
 providing a calculated correction value for said two prevailing engine operating parameters, said providing step further including the steps of:
  multiplying each of four correction values stored in a correction map at four array points in said two-dimensional array which surround the prevailing engine operating parameters, by respective weighting factors to provide four product values; and summing said four product values to produce a calculated correction value;
 determining a command value for said input control parameter by summing said basic value and said calculated correction value; and
 updating said values stored in said correction map by the steps of:
  producing a series of error values;
  multiplying each error value by a respective weighting factor for each of said four array points to form four product values; and
  using said four product values to update said correction values stored at said four array points;
 said weighting factors being determined by steps of:
  forming a main rectangle whose corners lie on said four array points surrounding said prevailing engine operating parameters;
  dividing said main rectangle into four sub-rectangles by an ordinate and abscissa which pass through said prevailing engine operating parameters; and
  calculating said weighting factor for each array point in dependence upon the area of the diagonally opposite sub-rectangle.

20. The method as claimed in claim 19, wherein said weighting factor for each array point is calculated by the step of dividing the area of a diagonally opposite sub-rectangle by the area of said main rectangle.

21. A method of determining an internal combustion engine input control parameter, said method comprising the steps of:
 determining a first engine operating parameter;
 determining a second engine operating parameter;
 determining a basic value of said engine input control parameter in accordance with a fixed map;
 storing correction values for said input control parameter as a two-dimensional array as a function of said two engine operating parameters;
 providing a calculated correction value for said two prevailing engine operating parameters, said providing step further including the steps of:
  multiplying each of three correction values stored in a correction map at three array points in said two-dimensional array which are closest to the prevailing engine operating parameters, by respective weighting factors to provide three product values; and
  summing said three product values to produce a calculated correction value;
 determining a command value for said input control parameter by summing said basic value and said calculated correction value; and
 updating said values stored in said correction map by the steps of:
  producing a series of error values;
  multiplying each error value by a respective weighting factor for each of said three array points to form three product values; and
  using said three product values to update said correction values stored at said three array points;
 said weighting factors being determined by steps of:
  forming a main triangle whose corners lie on said three array points surrounding said prevailing engine operating parameters;
  dividing said main triangle into three sub-triangles by connecting each of said three array points to said prevailing engine operating parameters by a line segment; and
  calculating said weighting factor for each array point in dependence upon the area of the diagonally opposite sub-triangle.

22. The method as claimed in claim 21, wherein said weighting factor for each array point is calculated by the step of dividing the area of a diagonally opposite sub-triangle by the area of said main triangle.

23. The method as claimed in one of claims 19, 20, 21 or 22, wherein said updating step further includes:
 multiplying each of said product values by a constant; and adding the resulting values from the previous step to the respective correction values presently stored at the respective array points.

24. The method as claimed in one of claims 19, 20, 21 wherein said first engine operating parameter is engine speed, said second engine operating parameter is load demand and fixed values of said engine input control parameter are stored in a fixed schedule as a function of engine speed and load demand, and each basic value of said engine input control parameter is determined for the value stored at said array points in the two-dimensional array which surround the prevailing speed and load demand, said input control parameter at each point is multiplied by a respective weighting factor to form a product value and the product values are summed to produce the basic value.

25. A method of determining slope of variations in engine output with respect to variations in an input control parameter for a rotating internal combustion engine having fire periods, said engine operating through a drive train, said engine and drive train comprising a resonant system having at least one resonant frequency, said method comprising the steps of:
  determining a basic value for a first engine input control parameter;
  detecting the rotational position of said engine at least once during each engine fire period;
  perturbing said input control parameter about said basic value, said perturbing step including the steps of:
    generating a perturbation waveform; and
    applying a positive perturbation to said input control parameter during the first part of each period of the perturbation waveform and a negative perturbation to said input control parameter during the second part of each period of the perturbation waveform, each period of said waveform being equal to a whole number of engine fire periods and the frequency of said waveform being greater than three-quarters of the highest resonant frequency of the resonant system;
  creating at least one series of contiguous positive and negative measurement windows associated respectively with first and second parts of said perturbation waveform, each measurement window lagging its respective part of the perturbation waveform by a predetermined phase shift; and
  calculating the slope of engine output with respect to said input control parameter, said slope calculation being based upon the change in engine speed between adjacent measurement windows.

26. A method of providing an adaptive control system for a rotating internal combustion engine having fire periods, said engine connected through a drive train to a load forming a resonant system having at least one resonant frequency said method comprising the steps of:
  determining a basic value for an engine input control parameter;
  detecting the rotational position of said engine at least once during each engine fire period;
  perturbing said input control parameter about said basic value, said perturbing step including the steps of:
    generating a perturbation waveform; and
    applying a positive perturbation to said input control parameter during the first part of each period of the perturbation waveform and negative perturbation to said input control parameter during the second part of each period of the perturbation waveform, each period of said waveform being equal to a whole number of engine fire periods and the frequency of said waveform being greater than three-quarters of the highest resonant frequency of the resonant system;
  creating at least one series of contiguous positive and negative measurement windows associated respectively with first and second parts of said perturbation waveform, each measurement window lagging its respective part of the perturbation waveform by a predetermined phase shift;
  calculating the slope of engine output with respect to said input control parameter, said slope calculation being based upon the change in engine speed between adjacent measurement windows; and
  controlling at least one engine input control parameter in a desired value of slope.

27. The method of controlling a power producing engine, said engine having at least one input which affects an engine output, said method comprising the steps of determining a first engine operating parameter;
  determining a first engine operating parameter;
  determining a second engine operating parameter;
  determining a baseline value for said engine input control parameter in accordance with a fixed map;
  storing correction values for said input control parameter as a two-dimensional array as a function of said two engine operating parameters;
  providing a calculated correction value for said two prevailing engine operating parameters, said providing step further including the steps of:
    multiplying each of four correction values stored in a correction map at four array points in said two-dimensional array which surround the prevailing engine operating parameters, by respective weighting factors to provide four product values; and
    summing said four product values to produce a calculated correction value;
  determining a command value for said input control parameter by summing said baseline value and said calculated correction value;
  updating said values stored in said correction map by the steps of:
    producing a series of error values;
    multiplying each error value by a respective weighting factor for each of said four array points to form four product values; and
    using said four product values to update said correction values stored at said four array points;
  said weighting factors being determined by the steps of:
    forming a main rectangle whose corners lie on said four array points surrounding said prevailing engine operating parameters;
    dividing said main rectangle into four sub-rectangles by an ordinate and abscissa which pass through said prevailing engine operating parameters; and
    calculating said weighting factor for each array point in dependence upon the area of the diagonally opposite sub-rectangle;
  periodically perturbing said engine input control parameter about said command value;
  monitoring said engine output;

determining the slope of engine output with respect to said engine input control parameter; and adjusting said engine input control parameter so as to obtain a desired value of said slope.

28. The method as claimed in claim 27, wherein said weighting factor for each array point is calculated by dividing the area of a diagonally opposite sub-rectangle by the area of said main rectangle.

29. The method as claimed in claim 28, wherein said first engine operating parameter is engine speed and said second engine operating parameter is engine load demand and said engine input control parameter is engine spark advance.

30. The method of providing an adaptive control system for a rotating internal combustion engine having fire periods and an output, said engine connected through a drive train to a load forming a resonant system having at least one resonant frequency said method comprising the steps of:

determining a baseline value for at least one engine input control parameter in accordance with a fixed schedule; detecting the rotational position of said engine at least once during each engine fire period;

perturbing said input control parameter about said baseline value, said perturbing step including the steps of:

generating a perturbation waveform; and applying a positive perturbation to said input control parameter during the first part of each period of the perturbation waveform and a negative perturbation to said input control parameter during the second part of each period of the perturbation waveform, each period of said waveform being equal to a whole number of engine fire periods and the frequency of said waveform being greater than three quarters of the highest resonant frequency of the resonant system;

creating at least one series of contiguous positive and negative measurement windows associated respectively with first and second parts of said perturbation waveform, each measurement window lagging its respective part of the perturbation waveform by a predetermined phase shift;

monitoring said engine output;

calculating the slope of engine output with respect to said input control parameter, said slope calculation being based upon the change in engine speed between adjacent measurement windows; and controlling at least one engine input control parameter to obtain a desired value of slope.

31. The method as claimed in claim 30, said method including the further steps of determining a first engine operating parameter;

determining a second engine operating parameter; and wherein said baseline determining step includes the steps of:

storing said correction values for said input control parameter as a two-dimensional array as function of said two engine operating parameters;

providing a calculated correction value for said two prevailing engine parameters, said providing step further including the steps of:

multiplying each of four correction values stored two-dimensional array at four array points in said two-dimensional array which surrounds the prevailing engine operating parameters, by respective weighting factors to provide four product values; and summing said four product values to produce a calculated correction value;

determining a command value for said input control parameter by summing said baseline value and said calculated correction value; and updating said values stored in said correction schedule by the steps of:

producing a series of error values;

multiplying each error value by a respective weighting factor for each of said four array points to form four product values; and using said four product values to update said correction values stored at said four array points;

said weighting factors being determined by the steps of:

forming a main rectangle whose corners lie on said four array points surrounding said prevailing engine operating parameters;

dividing said main rectangle into four sub-rectangles by an ordinate and abscissa which pass through said prevailing engine operating parameters; and calculating said weighting factor for each array point in dependence upon the area of the diagonally opposite sub-rectangle; and controlling said engine with said command value of said at least one input control parameter.

32. The method as claimed in claim 26 or 31, including the further steps of:

accumulating, for each positive measurement window, the individual fire periods whose central points fall within said positive window to produce a total fire period for said positive window; and accumulating, for negative measurement window, the individual fire periods whose central points fall within said negative window to produce a total fire period for said negative window, wherein said slope calculating step is responsive to said total fire periods accumulated in said first and second accumulating steps.

33. The method as claimed in claim 27, wherein said calculating step further includes the steps of:

calculating the average engine speed during each positive measurement window by dividing the number of engine fires occurring during said positive window by the total fire period accumulated in said first accumulating step and calculating the average engine speed during each negative measurement window by dividing the number of engine fires accumulated in said second accumulating step;

calculating each slope value by subtracting the average engine speed occurring in a positive window from the average engine speed occurring in a subsequent negative window to obtain a first transition value; subtracting the average engine speed occurring in a negative window from the average engine speed occurring in a subsequent positive window to obtain a second transition value; and subtracting said first transition value from said second transition value to obtain said slope value.

34. The method as claimed in claim 32, wherein said slope calculating step includes the steps of:

subtracting the product of the number of engine fires occurring in one positive window and the total fire period occurring in a subsequent negative window from the product of the total number of engine fires occurring in said subsequent negative window and the total fire period occurring in said one positive window to produce a first difference value;

subtracting the product of the number of engine fires occurring in one negative window and the total fire period for a subsequent positive window from the product of the total number of engine fires occurring in said subsequent positive window and the total fire period occurring in said one negative window to produce a second difference value; and subtracting said first difference value from said second difference value to produce said slope value.

35. The method as claimed in claim 34, wherein said controlling step includes the steps of:
   comparing each slope value with a reference value to determine a difference value;
   integrating said difference value to obtain an average value; and
   using said average value, correcting at least one engine input control parameter.

36. The method as claimed in one of claims 26, 30 or 31, wherein said perturbed input control parameter is the same parameter as the controlled said at least one engine input control parameter.

* * * * *